(12) United States Patent
Mott et al.

(10) Patent No.: US 8,103,672 B2
(45) Date of Patent: Jan. 24, 2012

(54) APPARATUS, SYSTEM, AND METHOD FOR DETERMINING A PARTIAL CLASS MEMBERSHIP OF A DATA RECORD IN A CLASS

(75) Inventors: Jack E. Mott, Idaho Falls, ID (US); Michael A. Madrazo, Escondido, CA (US)

(73) Assignee: Detectent, Inc., Escondido, CA (US)

( * ) Notice: Subject to any disclaimer, the term of this patent is extended or adjusted under 35 U.S.C. 154(b) by 307 days.

(21) Appl. No.: 12/469,599

(22) Filed: May 20, 2009

(65) Prior Publication Data

US 2010/0299294 A1    Nov. 25, 2010

(51) Int. Cl.
*G06F 17/30* (2006.01)
*G06F 7/00* (2006.01)
(52) U.S. Cl. ......... 707/737; 707/723; 707/748; 707/955
(58) Field of Classification Search .................. None
See application file for complete search history.

(56) References Cited

U.S. PATENT DOCUMENTS

| | | | |
|---|---|---|---|
| 4,937,763 A | 6/1990 | Mott | |
| 5,764,509 A | 6/1998 | Gross et al. | |
| 5,828,812 A | 10/1998 | Khan et al. | |
| 6,185,328 B1 | 2/2001 | Shiau | |
| 6,189,002 B1 * | 2/2001 | Roitblat | 1/1 |
| 6,341,283 B1 | 1/2002 | Yamakawa et al. | |
| 6,424,960 B1 * | 7/2002 | Lee et al. | 706/20 |
| 6,606,620 B1 * | 8/2003 | Sundaresan et al. | 1/1 |
| 6,757,668 B1 | 6/2004 | Goebel et al. | |
| 6,947,597 B2 | 9/2005 | Lin et al. | |
| 7,016,816 B2 | 3/2006 | Mott | |
| 7,024,408 B2 * | 4/2006 | Dehlinger et al. | 707/739 |
| 7,340,443 B2 | 3/2008 | Dugan et al. | |
| 7,370,021 B2 | 5/2008 | Reeve et al. | |
| 7,574,409 B2 * | 8/2009 | Patinkin | 706/12 |
| 7,801,878 B2 * | 9/2010 | Hayes et al. | 707/708 |
| 7,904,398 B1 * | 3/2011 | Repici | 706/15 |
| 2002/0031268 A1 | 3/2002 | Prabhakar et al. | |
| 2003/0014191 A1 | 1/2003 | Agrafiotis et al. | |
| 2003/0063803 A1 | 4/2003 | Lin et al. | |
| 2003/0233197 A1 | 12/2003 | Padilla et al. | |
| 2004/0158581 A1 | 8/2004 | Kotlyar et al. | |
| 2006/0095521 A1 * | 5/2006 | Patinkin | 709/206 |
| 2006/0246458 A1 | 11/2006 | Kiyuna et al. | |
| 2006/0294035 A1 | 12/2006 | Siegel et al. | |
| 2010/0017354 A1 * | 1/2010 | Chan et al. | 706/47 |

* cited by examiner

*Primary Examiner* — Greta Robinson
*Assistant Examiner* — James J Wilcox
(74) *Attorney, Agent, or Firm* — Kunzler Needham Massey & Thorpe

(57) ABSTRACT

An apparatus, system, and method are disclosed for determining a partial class membership of a data record in a class. The apparatus includes a record set acquisition module that receives a set of reference records having the same independent variables and belonging to a known class within a group of classes. An unknown-class record receiving module receives an unknown-class record having same independent variables as reference records. A class identification module creates a class vector for each reference record identifying whether the record is in a class. A weighting module calculates a set of unknown-class record weights for the unknown-class record. A classification module determines a partial class membership for the unknown-class record for each class in the group of classes using the set of unknown-class record weights. Each partial class membership identifies a probability that the unknown-class record belongs to a corresponding class in the group of classes.

19 Claims, 16 Drawing Sheets

|   A         |   B         |   C         |   D         |   E         |
|-------------|-------------|-------------|-------------|-------------|
| \|0.3327761\| | \|0.1460707\| | \|0.3862110\| | \|0.3366306\| | \|0.3509225\| |
| \|0.2834520\| | \|0.4531264\| | \|0.5982451\| | \|0.5538101\| | \|0.4055877\| |
| \|0.3092930\| | \|0.1590956\| | \|0.4396207\| | \|0.3399547\| | \|0.2256618\| |
| \|0.5356642\| | \|0.3472791\| | \|0.4205600\| | \|0.8559714\| | \|0.5007302\| |
| \|0.1323684\| | \|0.3019547\| | \|0.1500443\| | \|0.1220694\| | \|0.4071532\| |
| \|0.9523022\| | \|0.5677497\| | \|0.3821847\| | \|0.5688316\| | \|0.6804989\| |
| \|0.3498616\| | \|0.3183995\| | \|0.1114835\| | \|0.4308764\| | \|0.3201177\| |
| \|0.5226010\| | \|0.6098459\| | \|0.5839266\| | \|0.4252475\| | \|0.7097940\| |
| \|0.0956000\| | \|0.5428188\| | \|0.3730794\| | \|0.1381180\| | \|0.5526670\| |

|   A         |   B         |   C         |   D         |   E         |
|-------------|-------------|-------------|-------------|-------------|
| \|1.0000000\| | \|1.0000000\| | \|0.0000000\| | \|0.0000000\| | \|1.0000000\| |
| \|0.0000000\| | \|0.0000000\| | \|1.0000000\| | \|0.0000000\| | \|0.0000000\| |
| \|0.0000000\| | \|0.0000000\| | \|0.0000000\| | \|1.0000000\| | \|0.0000000\| |
| 906a        | 906b        | 906c        | 906d        | 906e        |

|0.3246260| ⌇1004a
|0.2708952| ⌇1004b
1002 ⌇|0.2454118| ⌇1004c
|0.1590669| ⌇1004d
|0.0000000| ⌇1004e

FIG. 10

$$\begin{array}{c}1102a\\1102b\\1102c\end{array}\begin{array}{c}|0.5955213|\\|0.2454118|\\|0.1590669|\end{array} = \begin{array}{c}|1.0000000|\\|0.0000000|\\|0.0000000|\end{array} \times 0.3246260 + \begin{array}{c}|1.0000000|\\|0.0000000|\\|0.0000000|\end{array} \times 0.2708952 +$$

with labels 1104 (on 0.5955213), 906a, 1004a, 906b, 1004b $$\begin{array}{c}|0.0000000|\\|1.0000000|\\|0.0000000|\end{array} \times 0.2454118 + \begin{array}{c}|0.0000000|\\|0.0000000|\\|1.0000000|\end{array} \times 0.1590669$$

with labels 906c, 1004c, 906d, 1004d

FIG. 11

APPARATUS, SYSTEM, AND METHOD FOR DETERMINING A PARTIAL CLASS MEMBERSHIP OF A DATA RECORD IN A CLASS

FIELD OF THE INVENTION

This invention relates to classifying a data record and more particularly relates to simultaneous identification of a partial class membership of a data record in a number of classes.

BACKGROUND

Description of the Related Art

Data classification of an unknown-class record having a number of independent variables typically involves making separate, binary estimates for each possible class as to whether the unknown-class record is in each class or not in each class. As a result, such estimates are typically combined by means of another algorithm that determines which of the estimates is best. Combinatorial problems, which grow very large as the number of possible classes grows large, may then require the use of information, considerations and assumptions that are outside the reference data. Furthermore, with real data there is often a problem with spurious entries that cause deleterious effects in empirical models based on reference data.

SUMMARY

From the foregoing discussion, it should be apparent that a need exists for an apparatus, system, and method that provide simultaneous estimates of memberships in a number of classes. Beneficially, such an apparatus, system, and method would never require information, considerations or assumptions that are outside the reference data and would be able to cleanse reference data for an unknown-class record and provide simultaneous estimates of memberships in a multiplicity of classes no matter how large the multiplicity.

The present invention has been developed in response to the present state of the art, and in particular, in response to the problems and needs in the art that have not yet been fully solved by currently available data classification systems. Accordingly, the present invention has been developed to provide an apparatus, system, and method for determining a partial class membership of a data record within a class that overcome many or all of the above-discussed shortcomings in the art.

The apparatus to determine a partial class membership of a data record in a class is provided with a plurality of modules configured to functionally execute the necessary steps of simultaneously estimating partial class memberships of an unknown-class record in a number of classes. These modules in the described embodiments include a record set acquisition module, an unknown-class record receiving module, a class identification module, a weighting module, and a classification module.

The record set acquisition module receives a record set having a number of reference records. Each reference record has a set of independent variables, with each independent variable having an independent variable value. Each reference record in the record set has the same set of independent variables and each reference record belongs to a known class within a group of classes.

The unknown-class record receiving module receives an unknown-class record. The unknown-class record has the same set of independent variables as the independent variables of the reference records that make up the record set.

The class identification module creates a class vector for each reference record by setting a class identifier for the class of the reference record to a first value. The class identification module sets a class identifier for each known class in the group of classes other than the known class of the reference record to a second value.

The weighting module calculates a set of unknown-class record weights for the unknown-class record. The weighting module calculates a weight for each reference record. The set of unknown-class record weights are calculated such that, when multiplied by the independent variable values of the reference records, the set of unknown-class record weights approximate the set of independent variable values for the unknown-class record. Each weight in the set of unknown-class record weights has a value greater than or equal to zero and less than or equal to one. The sum of the set of unknown-class record weights approximates one.

The classification module determines a partial class membership for the unknown-class record for each class in the group of classes. The partial class memberships are determined by applying the class vectors created by the class identification module to the set of unknown-class record weights created by the weighting module. Each partial class membership identifies the probability that the unknown-class record belongs to a corresponding class in the group of classes.

The apparatus, in one embodiment, also includes a record set weighting module, a record set classification module, and a cross-validation module. The record set weighting module calculates a set of reference record weights for a tested reference record. The record set weighting module calculates a weight for each reference record in a remainder of reference records in the record set. The remainder of reference records includes the reference records in the record set excluding the tested reference record. The set of reference record weights are calculated as a weighted sum of the independent variable values of the remainder of reference records in the record set that, when multiplied by the independent variable values of the remainder of reference records in the record set, approximates a set of independent variable values for the tested reference record. Each weight in the set of reference record weights has a value greater than or equal to zero and less than or equal to one and the sum of the set of reference record weights approximates one.

The record set classification module determines a reference record partial class membership for the tested reference record for each class in the group of classes. The reference record partial class membership is determined by applying the class vectors for each of the remainder of reference records in the record set to the set of reference record weights created by the record set weighting module. A reference record partial class membership is determined for each class in the group of classes. Each reference record partial class membership identifies a probability that the tested reference record belongs to a corresponding class in the group of classes.

The cross-validation module compares the known class of the tested reference record with the reference record partial class membership to determine whether the tested reference record belongs to the known class of the reference record.

In a further embodiment, the cross-validation module determines that the tested reference record belongs to the known class of the tested reference record by determining that the reference record partial class membership corresponding to the known class of the tested reference record is highest with respect to the other reference record partial class memberships calculated by the record set classification module.

In another embodiment, the cross-validation module determines that the tested reference record belongs to the known class of the tested reference record by determining that the reference record partial class membership corresponding to the known class of the tested reference record is higher than a known partial class membership threshold.

In one embodiment the apparatus also includes a cleansing module that removes a reference record from the record set if the cross-validation module determines that the tested reference record is not in the known class of the tested reference record.

In certain embodiments, the apparatus also includes a cross-validation record set creation module. The cross-validation record set creation module creates a unique cross-validation record set for the tested reference record by selecting a number of reference records in the record set that are nearest neighbors to the tested reference record. The reference records selected for the unique cross-validation record set includes any number of reference records. In one embodiment the record set weighting module calculates the set of reference weights using the unique cross-validation record set. In one embodiment the number of reference records selected by the cross-validation record set creation module for the unique cross-validation record set is less than or equal to the number of independent variables in each reference record.

In certain embodiments the cross-validation record set creation module selects the number of reference records in the record set that are nearest neighbors to the tested record by comparing a sum of square differences calculated for each reference record in the record set to identify a number of reference records in the record set that are the nearest neighbors to the tested reference record. The cross-validation record set creation module selects the reference record having the least sum of square differences for inclusion in the unique cross-validation record set. The sum of square differences is calculated as a difference between the independent variable values of the tested reference record and the independent variable values for the reference records making up the record set The apparatus, in one embodiment, also includes an unknown-class record set creation module. The unknown-class record set creation module creates an unknown-class record set for the unknown-class record by selecting a number of reference records in the record set that are nearest neighbors to the unknown-class record. The number of reference records selected for the unknown-class record set includes any number of reference records. The weighting module calculates the set of unknown-class record weights for the unknown-class record using the reference records in the unknown-class record set. In one embodiment the number of reference records selected by the unknown-class record set creation module for the unknown-class record set is less than or equal to the number of independent variables in the unknown-class record.

In one embodiment, the unknown-class record set creation module selects the number of reference records in the record set that are nearest neighbors to the unknown-class record. The nearest neighbors are selected by comparing a sum of square differences calculated for each reference record in the record set to identify a number of reference records in the record set that are the nearest neighbors to the unknown-class reference record. The nearest neighbors are included in the unknown-class record set by selecting the reference records having the least sum of square differences. The sum of square differences are calculated as a difference between the independent variable values of the unknown-class reference record and the independent variable values for the reference records that make up the record set.

In certain embodiments, the weighting module calculates the set of unknown-class record weights by applying one of a least squares vector element model, a support vector model, a neural network model and a kernel regression model.

The weighting module, in one embodiment, calculates the set of unknown-class record weights according to the formula $W=(R^TR)^{-1}R^TX$. In this formula W is a vector of the unknown-class record weights, R is a matrix of the independent variable values for each reference record in the record set, and X is a vector containing the independent variable values of the unknown-class record. One of skill in the art will recognize that the elements of R and X should, in certain embodiments, be transformed by operations such as scaling and shifting in a consistent manner in order that the equation for W achieve accurate results.

The classification module, in certain embodiments, determines the partial class membership for the unknown-class record for each class in the group of class according to the formula $P=CW$. In this formula P is a vector of partial class memberships for each class in the group of classes, C is a matrix of class identifiers identified by the class identification module for each reference record in the record set, and W is a vector of the unknown-class record weights.

In certain embodiments, the classification module determines that the unknown-class record belongs to a class of the group of classes by determining that the partial class membership for the class of the group of classes is highest with respect to the other partial class memberships for the other classes within the group of classes.

In another embodiment the classification module determines that the unknown-class record belongs to a class of the group of classes by determining that the partial class membership corresponding to a class is higher than a class membership threshold.

In a further embodiment an apparatus to determine a partial class membership of a data record in a class is provided with a plurality of modules configured to functionally execute the necessary steps of simultaneously estimating partial class memberships of an unknown-class record in a number of classes. These modules in the described embodiments include a class identification module, a weighting module, and a classification module.

The class identification module creates a class matrix C for a plurality of reference records in a record set. Each reference record includes a set of independent variables having independent variable values. The class matrix C includes a class identification vector for each reference record. The class identification vector identifies a known class for the reference record from a group of classes. The class identification vector includes a class identifier for each class in the group of classes. The class identifier is set to one for the known class and set to zero for each class other than the known class.

The weighting module calculates a vector W having unknown-class record weights for an unknown-class record. The vector W of unknown-class record weights is calculated as $W=(R^TR)^{-1}R^TX$. In the formula $W=(R^TR)^{-1}R^TX$, R is a matrix of independent variable values for a record set of reference records and X is a vector of independent variable values for the unknown-class record. The vector W of unknown-class record weights is calculated so that $Y=RW$ where Y is an approximation of the independent variable values in the vector X. Each unknown-class record weight in vector W comprises a value greater than or equal to zero and less than or equal to one, and the sum of the weights in vector W approximates one. One of skill in the art will recognize that the elements of R, X and Y should, in certain embodiments, be transformed by operations such as scaling and shifting in a consistent manner in order that the equations just identified achieve accurate results.

The classification module that calculates a partial class membership vector P for the unknown-class record according to the formula P=CW. The partial class membership vector P has a probability value for each class in the group of classes, the probability value identifies a probability that the unknown-class record belongs to a corresponding class in the group of classes.

In certain embodiments the apparatus to determine a partial class membership of a data record in a class also includes a record set weighting module, a record set classification module and a cross-validation module.

The record set weighting module calculates a vector W' including tested reference record weights for a tested reference record. The vector W' of tested reference record weights is calculated according to the formula $W'=(R'^T R')^{-1} R'^T X'$, where R' is a matrix of independent variable values for a tested reference record set and X' is a vector of independent variable values for the tested reference record. The tested reference record set includes a group of reference records from the record set. The vector W' of tested reference record weights is calculated so that Y'=R'W' where Y' is vector identifying an approximation of the independent variable values in the vector X'. Each tested reference record weight in the vector W' has a value greater than or equal to zero and less than or equal to one, and the sum of the weights in vector W' approximates one. One of skill in the art will recognize that the elements of R', X' and Y' should, in certain embodiments, be transformed by operations such as scaling and shifting in a consistent manner in order that the equations just identified achieve accurate results.

The record set classification module calculates a tested reference record set partial class membership vector P' for the tested reference record according to the formula P'=C'W'. The tested reference record set partial class membership vector P' includes a probability value for each class in the group of classes. The probability value identifies a probability that the tested reference record belongs to a corresponding class in the group of classes. In the formula P'=C'W', C' is a tested reference record set class matrix having a tested reference record set class identification vector for each reference record in the tested reference record set. The tested reference record set class identification vector identifies a known class for the reference records of the tested reference record set. The tested reference record set class identification vector has a class identifier for each class in the group of classes. The class identifier is set to one for the known class and set to zero for each class other than the known class.

The cross-validation module compares the known class of the tested reference record with the reference record partial class membership P' to determine whether the tested reference record belongs to the known class of the tested reference record.

A computer program product of the present invention is also presented that includes a computer readable medium having a computer usable program code that performs operations for determining a partial class membership of a data record in a class. In one embodiment the operations for determining the partial class membership of a data record in a class includes receiving a record set having a plurality of reference records. Each reference record has a set of independent variables. Each independent variable has an independent variable value. Each reference record of the record set has the same set of independent variables and each reference record belongs to a known class within a group of classes.

The operations of the computer program product also include receiving an unknown-class record. The unknown-class record has a same set of independent variables as the independent variables of the reference records in the record set.

The computer program product creates a class vector for each reference record by setting a class identifier for the class of the reference record to a first value. A class identifier for each known class other than the known class of the reference record is set to a second value.

The computer program product calculates a set of unknown-class record weights for the unknown-class record. The set of unknown-class weights include a weight for each reference record. The set of unknown-class record weights calculated as a weighted sum of the independent variable values of the reference records that, when multiplied by the independent variable values of the reference records, approximates the set of independent variable values for the unknown-class record. Each weight in the set of unknown-class record weights has a value greater than or equal to zero and less than or equal to one and the sum of the set of unknown-class record weights approximates one.

A partial class membership for the unknown-class record is determined by the computer program product for each class in the group of classes. The partial class memberships are determined by applying the class vectors to the set of unknown-class record weights. Each partial class membership identifies a probability that the unknown-class record belongs to a corresponding class in the group of classes.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 9A is a schematic block diagram illustrating one embodiment of a matrix of independent variable values in accordance with the present invention;

FIG. 9B is a schematic block diagram illustrating one embodiment of a matrix of class identifiers in accordance with the present invention;

FIG. 10 is a schematic block diagram illustrating one embodiment of a vector of a set of weights in accordance with the present invention;

FIG. 11 is schematic block diagram illustrating one embodiment of an example of a calculation used to determine a partial class membership vector in accordance with the present invention;

DETAILED DESCRIPTION

Figure 1:
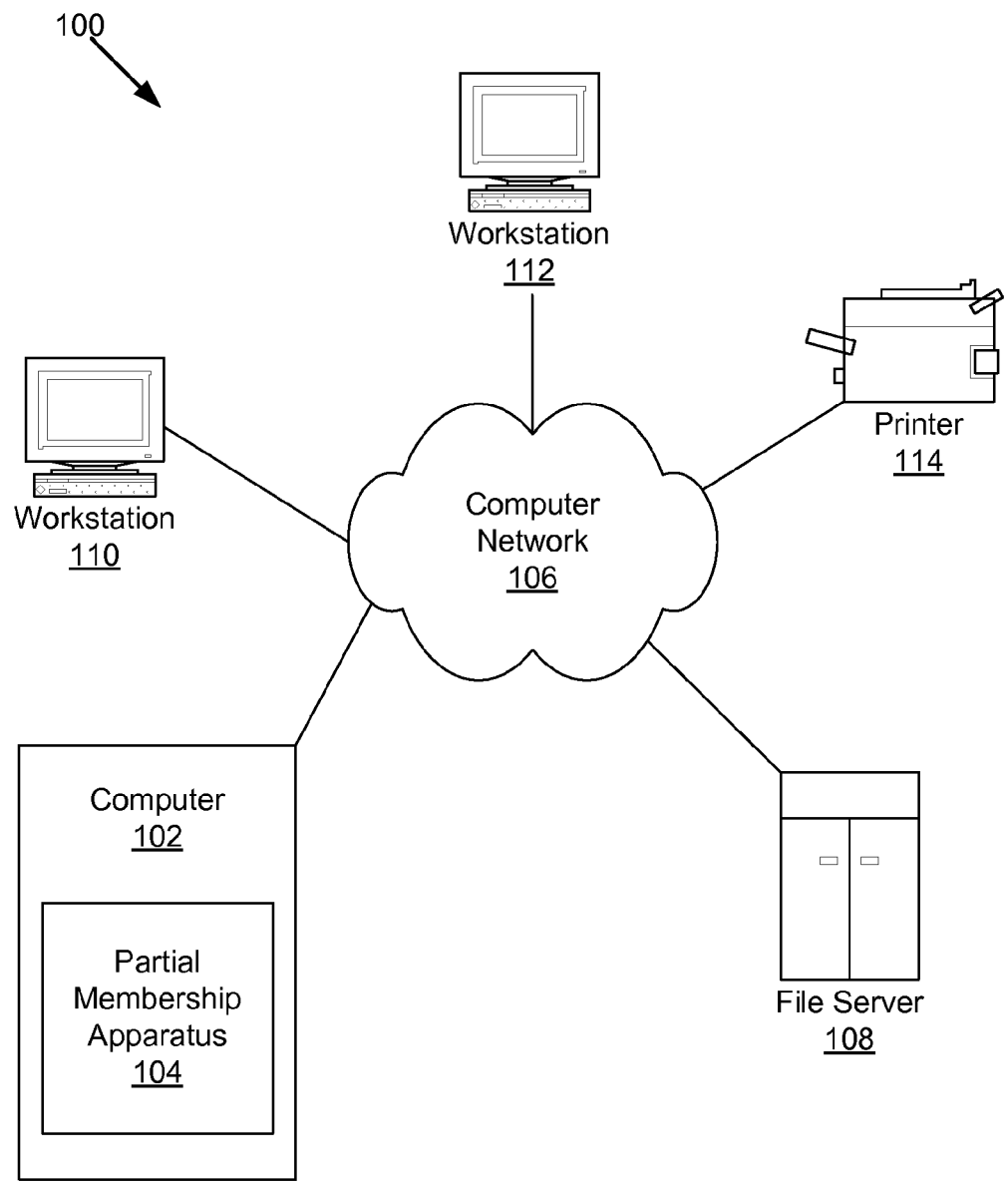
FIG. 1 is a schematic block diagram illustrating one embodiment of a system for determining a partial class membership of a data record in a class in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Partial class membership analysis ("PMA") is a new method for addressing data classification based on empirical models. With PMA, a record belonging to an unknown class is analyzed and compared with a set of records from a reference record library to identify which class the unknown-class record belongs to. Each reference record in the reference library includes a set of independent variables having independent variable values. Each reference record has a class vector identifying both the known class of the reference record as well as the classes that the reference record does not belong to. The unknown-class record also contains a set of independent variables having independent variable values. However, as the name suggests, the class of the unknown-class record is not known prior to analyzing the unknown-class record using PMA.

To create the record set, PMA compares the independent variable values of the unknown class record with the independent variable values of each of the reference records to identify the reference records in the reference library that are the nearest neighbors to the unknown-class record. The reference records from the reference library that are the nearest neighbors to the unknown-class record are used as the record set for PMA. Thus, in certain embodiments the record set is a subset of reference records from the reference library that includes fewer than all of the reference records in the reference library.

To classify the unknown-class record into a class, PMA calculates a set of unknown-class record weights, with a weight corresponding to each reference records in the record set. The unknown-class record weights are then multiplied by the corresponding class vectors of the reference records. The results are summed into a partial class membership vector with each entry in the partial class membership vector corresponding to a possible class. Each entry in the partial class membership vector can be interpreted as a probability that the unknown-class record belongs to that particular class. Thus, in this manner a record belonging to an unknown-class can be classified using PMA.

PMA features the novel combination of four features: a dynamic vector modeling technique, imposition of special constraints on the modeling weights, use of class vectors and predicted partial class membership vectors, and cleansing of reference data upon which the empirical models are based. These combined features allow PMA to provide two special characteristics: simultaneous determination of partial class memberships in a multiplicity of classes, and reduction of deleterious effects from spurious reference data.

FIG. 1 illustrates a system 100 for determining a partial class membership of a data record in a class. The system 100 includes a computer 102 containing a partial class membership apparatus 104 for determining the partial class membership of an unknown-class record in a class. In certain embodiments the system 100 includes a computer network 106, a file server 108, a number of work stations such as work stations 110 and 112, and an output device 114 such as a printer.

While the embodiment illustrated in FIG. 1 shows the partial class membership apparatus 104 contained on a computer, one skilled in the art will recognize that the partial class membership apparatus may be contained within a file server 108, a mainframe, a personal computer, a laptop, a personal digital assistant, or other computing device. The computer 102 and the file server 108 are connected to the computer network 106 providing access to the partial class membership apparatus 104 by the work stations 110 and 112. In certain embodiments additional workstations 110 and 112 may be connected to the computer network 106 providing access to the partial class membership apparatus 104 for additional users.

The partial class membership apparatus 104 maybe accessed directly through input/output devices connected to the computer 102 or through the computer network 106 in a client-server relationship, remote access, or other network-related operation. One of skill in the art will recognize other ways to access the partial class membership apparatus 104. In one embodiment, the partial class membership apparatus 104 is located together on a data storage device in or connected to a computer 102. In another embodiment, the partial class membership apparatus 104 is distributed and portions of the partial class membership apparatus 104 may be in different locations. For example, a workstation 110, 112 or other computing device may include a driver that is a portion of the partial class membership apparatus 104 while other executable code is located on another computer 102. One of skill in the art will recognize other ways to store and execute portions of the partial class membership apparatus 104.

An output device displays the results of the PMA performed by the partial class membership apparatus 104 for use by a user. In certain embodiments the output device may be a printer 114 that prints the results. In other embodiments the output device may be an electronic display such as a computer monitor. In one embodiment the output device may be configured to output a digital signal for display on workstations 110 and 112, a laptop computer, or other computing device.

Figure 2:
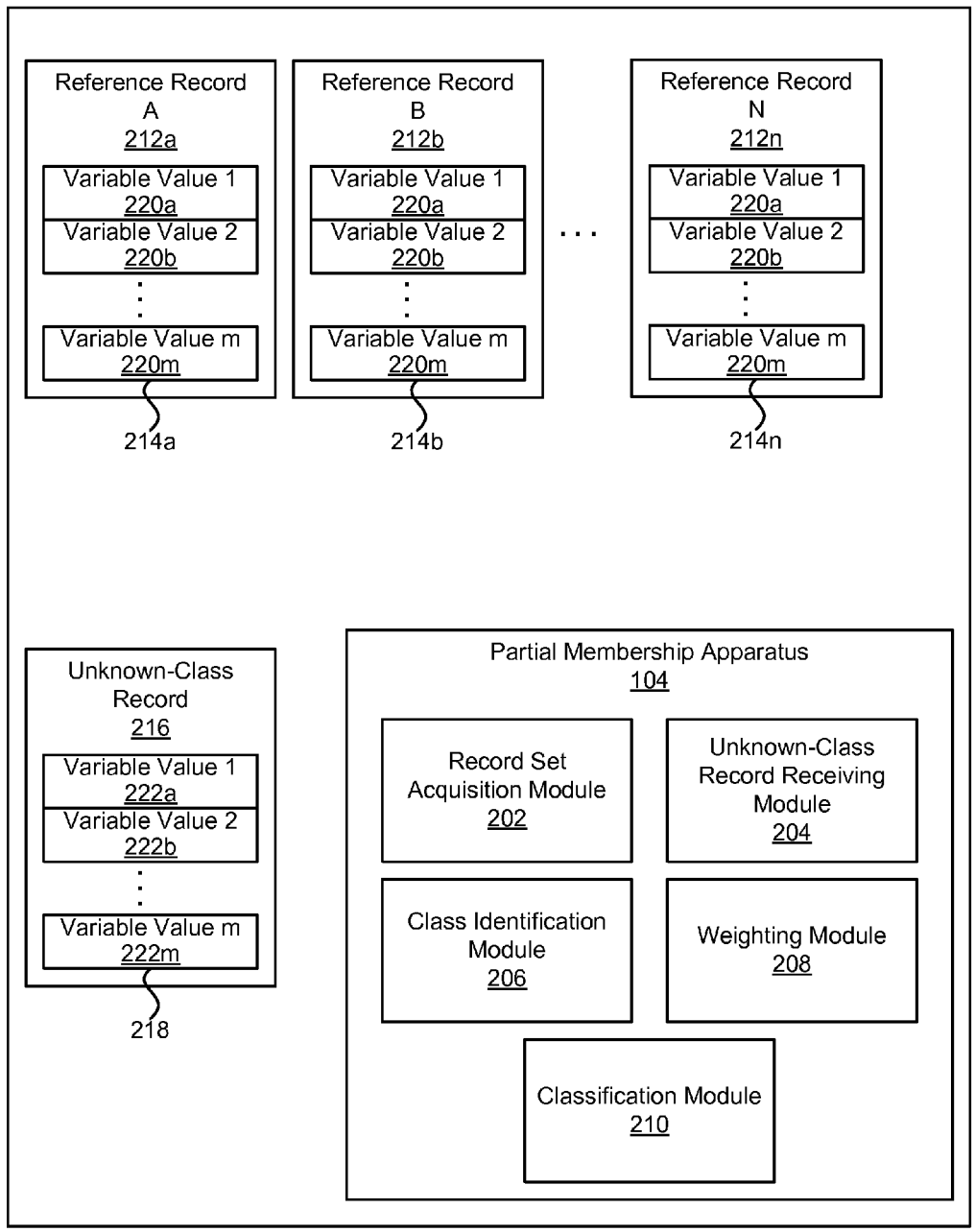
FIG. 2 is a schematic block diagram illustrating one embodiment of the partial class membership apparatus of FIG. 1 in accordance with the present invention.

FIG. 2 illustrates one embodiment of the partial class membership apparatus 104 of FIG. 1. In one embodiment, the partial class membership apparatus 104 includes a record set acquisition module 202, an unknown-class record receiving module 204, a class identification module 206, a weighting module 208, and a classification module 210, which are described below.

The partial class membership apparatus 104 performs a PMA for an unknown-class record 216 to determine a partial class membership vector for the unknown-class record 216. Each reference record 212a-212n contains a set of independent variables 214a-214n having independent variable values 220a-220m. Similarly, the unknown-class record 216 has a set of variables 218 having variable values 222a-222m.

The record set acquisition module 202 receives reference records 212a-212n from the reference library. One of skill in the art will recognize that the reference library can contain any number of reference records 212a-212n. Thus, the reference library is not limited to the reference records 212a-212n illustrated in FIG. 2. In certain embodiments the reference library may be expanded each time the partial class membership apparatus performs a PMA for an unknown-class record such as unknown-class record 216. Thus, in certain embodiments each unknown-class record 216 may be added to the reference library once the unknown-class record 216 is classified by PMA. In one embodiment, the record set acquisition module is configured to perpetually receive new reference records 212 as PMA is performed on new unknown-class records 216. Reference record 212n is depicted as reference record "N" indicating that in certain embodiments the final reference record 212n received by the record set acquisition module 202 is unknown until the final reference record 212n is received. In another embodiment there is no final reference record, that is, as reference records 212 are created, the record set acquisition module 202 receives the newly created reference record 212. In one embodiment, the record set acquisition module 202 is configured to perpetually receive new reference records 212 as the unknown-class records 216 are classified by PMA.

Each reference record 212 contains a set of independent variables 214. Each of the independent variables contained within a set of independent variables 214 has an independent variable value 220a-220m, thus there are M independent variable values 220a-220m in each reference record 212. In certain embodiments the independent variable values 220a-220m for each set of independent variables 214 are unique for each reference record 212. Generally, the independent variable values 220a-220m are different for each reference record 212.

For example, Table 1 shows a set of independent variables for a utility energy efficiency improvement program that may be used as the independent variables for the sets of independent variables 214a-214n of reference records 212a-212n in certain embodiments. While each reference record 212 contains the same independent variables, the independent variable values 220a-220m for each independent variable 1-40 may be different for each reference record 212. Thus, variable value 1 (220a) of reference record A (212a) may be substantially different than variable value 1 (220a) of reference record B (212b). One of skill in the art will recognize that in certain embodiments each variable value 220a-220m may include a distinct value.

TABLE 1

Variables for Classification in Utility Energy Efficiency Improvement Program

| 1 | YellowPagesYears |
| 2 | YellowPagesSpending |
| 3 | NumberOfPCs |
| 4 | Headquarters |
| 5 | AuthorityLevel |
| 6 | Title |
| 7 | NumberOfSquareFeet |
| 8 | CreditRating |
| 9 | AnnualSales |
| 10 | NumberOfEmployees |
| 11 | Income2005 |
| 12 | ElectricityMax |
| 13 | ElectricityMin |

TABLE 1-continued

Variables for Classification in Utility Energy Efficiency Improvement Program

| 14 | ElectricityBase |
| 15 | ElectricitySummer |
| 16 | DemandMax |
| 17 | DemandAvg |
| 18 | PctElectricHeating |
| 19 | ElectricHeating |
| 20 | PctElectricCooling |
| 21 | ElectricCooling |
| 22 | PctGasHeating |
| 23 | GasHeating |
| 24 | ElectricityWinter |
| 25 | AuthorityGender |
| 26 | YellowPagesBusinessCode |
| 27 | IncomePct |
| 28 | ElectricityMaxPerEmployee |
| 29 | ElectricityBasePerEmployee |
| 30 | ElectricitySummerPerEmployee |
| 31 | ElectricityWinterPerEmployee |
| 32 | DemandMaxPerEmployee |
| 33 | DemandAvgPerEmployee |
| 34 | ElectricityMaxPerSales |
| 35 | ElectricityBasePerSales |
| 36 | ElectricitySummerPerSales |
| 37 | ElectricityWinterPerSales |
| 38 | DemandMaxPerSales |
| 39 | DemandAvgPerSales |
| 40 | TurnOnDate |

In other embodiments two or more reference records 212a-212n may contain variable values 220a-220m which are identical. In another embodiment, a portion of the variable values 220a-220m for one set of independent variables 214a-214n may be identical to a portion of the variable values 220a-220m of another set of independent variables 214a-214n while a remaining portion of independent variable values 220a-220m are substantially different.

In certain embodiments the variable values 220a-220m for the sets of independent variables 214a-214n are quantified as a numerical value. For example, independent variable number 1 of Table 1 identifies the numerical number of years an entity correlating to a particular reference record 212a-212n has advertised in the yellow pages. Generally speaking the number of years an entity has participated in yellow page advertising can be readily expressed as a numerical value.

Other independent variables may not readily have a numeric value. For example, independent variable number 21 of Table 1 identifies whether an entity corresponding to a particular reference record 212a-212n has electric cooling. Ordinarily a determination of whether an entity has electric cooling does not immediately lend itself to a numerical value. Therefore, in certain embodiments the variable value may contain a numeric value that correlates to a non-numerical expression. For example, the variable value for independent variable number 21 of Table 1 may contain a binary number representing yes or no. If the entity correlating to the particular reference record, e.g. 212a, has electric cooling, the variable value for independent variable number 21 of Table 1 may be set to a "1". If the entity correlating to the particular reference record 212a does not have electric cooling, the variable value for independent variable number 21 of Table 1 may be set to a "0". Of course, one of skill in the art will recognize that any numerical value may be used to identify either having or not having electric cooling.

Similarly, certain sets of independent variables 214a-214n may contain variables that have numerous value possibilities. For example, the independent variable value for independent variable number 26 of Table 1 contains a value identifying the yellow pages business code for the particular entity. In the ordinary course of business the business code used by the yellow pages business directory to identify a category of business may or may not be expressed as a numerical value. Therefore, in certain embodiments, a numerical value may be assigned for every possible business code. In this manner, the variable value for independent variable number 26 of Table 1 may be expressed as a numerical value.

The unknown-class record receiving module 204 receives the unknown-class record 216. In one embodiment, the unknown-class record has the same set of independent variables 218 as the sets of independent variables 214$a$-214$n$ contained in reference records 212$a$-212$n$. In certain embodiments each independent variable in the set of independent variables 218 has an independent variable value 222$a$-222$m$. In other embodiments one or more of the independent variables in the set of independent variables 218 of the unknown-class record 216 may not have an independent variable value 222$a$-222$m$. Similarly, in certain embodiments one or more independent variables in the set of independent variables 214$a$-214$n$ of the reference records 212$a$-212$n$ may lack one or more independent variable values 220$a$-220$m$.

For example, in certain embodiments one or more independent variable in the set of independent variables 214$a$-214$n$ may lack an independent variable value 220$a$-220$m$ due to poor data acquisition. The same is true of the unknown-class record 216, in certain embodiments the set of variables 218 may lack one or more independent variable value 222$a$-222$m$. In such embodiments, the partial class membership apparatus 104 may require a threshold number of independent variable values 222$a$-222$m$ or independent variables 220$a$-220$m$ to classify the unknown-class record 216. In one embodiment the partial class membership apparatus 104 may require each reference record 212$a$-212$n$ in the reference library to contain a minimum number of variable values 220$a$-220$m$. In another embodiment, only the reference records 212$a$-212$n$ included in the record set may be required to contain a minimum number of variable values 220$a$-220$m$.

In certain embodiments, where a particular reference record 212$a$-212$n$ lacks the minimum number of variable values 220$a$-220$m$ required by the partial class membership apparatus 104 to determine a partial class membership for the unknown-class record 215, the apparatus may disregard the particular reference record 212$a$-212$n$ that lacks the minimum number of variable values 220$a$-220$m$. In other embodiments the partial class membership apparatus 104 may eliminate the particular reference 212$a$-212$n$ lacking the minimum number of variable values 220$a$-220$m$ from the reference library. The partial class membership apparatus 104 may also require a minimum number of reference records 212$a$-212$n$ to perform a PMA.

The class identification module 206 identifies the known class of each reference record 212 and creates a class vector identifying whether or not each particular reference record 212 belongs to each class. The class vector for each reference record 212 contains class identifiers for each possible class of the reference record. If the reference record belongs to a particular class, the class identifier for that particular class is set to a first numerical value. If the reference record does not belong to a particular class, the class identifier for that particular class is set to a second numerical value. In this manner, the class vector for each reference record contains a column of class identifiers with each identifier indicating whether the particular reference record belongs to the corresponding class. In certain embodiments the first value is a one and the second value is a zero. Thus, in certain embodiments the class vector created by the class identification module is a column containing ones and zeros identifying whether or not a particular reference record 212 belongs to each class in the group of possible classes. One of skill in the art will recognize that in certain embodiments the first and second values maybe set to other numerical values by the class identification module.

The weighting module 208 calculates a set of unknown-class record weights for the unknown-class record. The set of unknown-class record weights includes a weight for each reference record in the record set. The set of unknown-class record weights are calculated as a weighted sum of the independent variable values 220$a$-220$m$ of the reference records 212 in the record set that, when multiplied by the independent variable values 220$a$-220$m$ of the reference records 212 in the record set, approximates the set of independent variable values 222$a$-222$m$ of the unknown-class record. In certain embodiments each weight in the set of unknown-class record weights, calculated by the weighting module 208, has a value greater than or equal to zero and less than or equal to one. In one embodiment the sum of the set of unknown-class record weights is about one. In certain embodiments, the weighting module 208 calculates the set of unknown-class record weights for the unknown-class record using a least squares vector element model. In other embodiments the weighting module 208 may calculate the set of weights for the unknown-class record 218 using a support vector model, a neural network model, a kernel regression model or other weighting model as is known in the art.

The classification module 210 creates a partial class membership vector that identifies the probability that the unknown-class record 216 belongs to each possible class. In certain embodiments the partial class membership vector is created by multiplying each weight in the set of unknown-class weights calculated by the weighting module 208 by the class vector corresponding to weight. The results are summed into a partial class membership vector with each value in the partial class membership vector corresponding to a particular class. Accordingly, the first value in the partial class membership vector corresponds to the first class. The second value corresponds to the second class, and so on. In certain embodiments the values can be interpreted as the probability that the unknown-class record 216 belongs to the corresponding class.

Figure 3A:
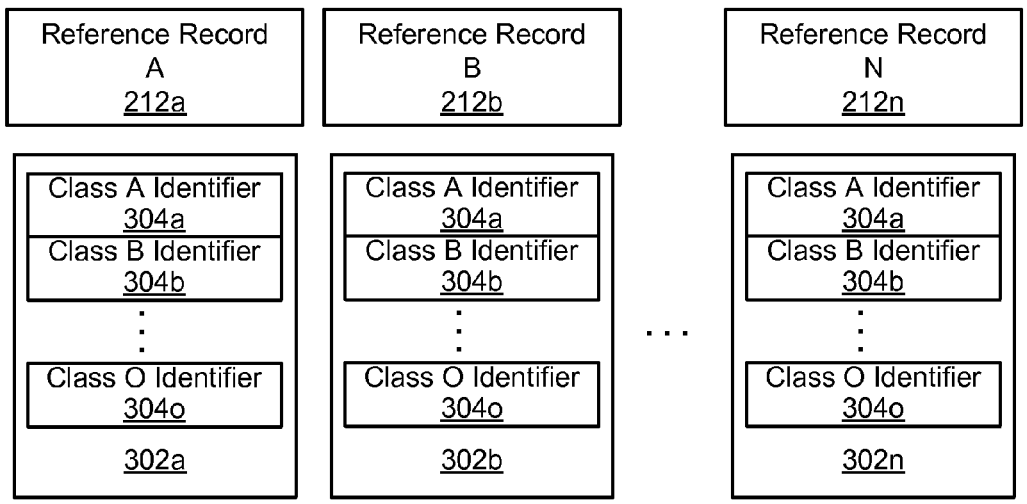
FIG. 3A is a schematic block diagram illustrating one embodiment of the class identification module of FIG. 2 in accordance with the present invention.

FIG. 3A illustrates one embodiment of the class vectors 302$a$-302$n$ created by the identification module 206 of the partial class membership apparatus 104. In certain embodiments the class identification module 206 creates a class vector 302$a$-302$n$ for each reference record 212$a$-212$n$ in the reference library. In other embodiments the class identification module 206 only creates class vectors 302 for reference records 212 in the record set.

The class vectors contain class identifiers such as class identifiers 304$a$-304$o$ identifying the known class of the corresponding reference record 212. To identify the known class of a particular reference record 212, such as reference record 212$a$, the class identifier 304$a$-304$o$ for the known class of that particular reference record 212$a$ is set to first value by the class identification module 206. Each class identifier 304$a$-304$o$ for the classes other than the known class of the particular reference record 212$a$ is set to a second value by the class identification module 206. For example, if reference record A 212$a$ belongs to class A, the class identification module 206 sets the class A identifier 304$a$ to a first value. The class identification module 206 sets the remaining class identifiers for classes B-O (304$b$-304$o$) to a second value. In certain embodiments the first value and second values may be binary. Thus, in the example just described, the class A identifier 304$a$ is set to a one and the class B-O identifiers (304$b$-304$o$)

are set to a zero or vice versa. The resulting vector 302a is shown in FIG. 3B with the class A identifier 304a set to a one and the remaining class identifiers 304b-304o for classes B-O set to a zero.

In one embodiment reference record B 212b may belong to Class B. In such an embodiment the class identification module 206 sets the class B identifier 304b to a first value. The class identification module 206 sets the remaining class identifiers for the classes other than class B 304b to a second value. In certain embodiments the first value and the second values are binary. Thus, in the example just described the class B identifier 304b is set to a one and the remaining classes are set to a zero or vice versa. The resulting vector 302b is shown in FIG. 3B with the class B identifier 304b set to a one and the remaining class identifiers 204a and 304o set to a zero.

Figures 3B, 3C, 3D:
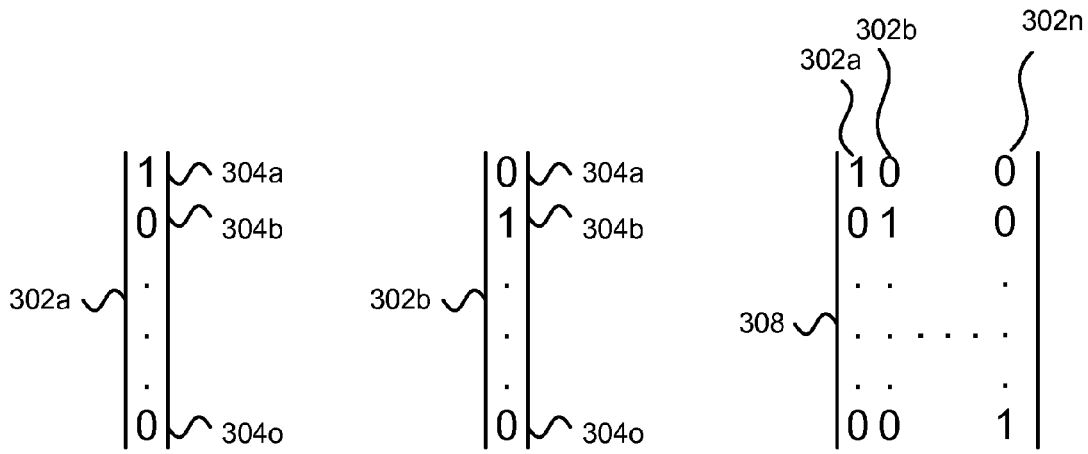
FIGS. 3B and 3C are schematic block diagrams illustrating embodiments of class vectors created by the class identification module of FIG. 3A in accordance with the present invention.
FIG. 3D is a schematic block diagram illustrating one embodiment of a class matrix created by the class identification module of FIG. 3A in accordance with the present invention.

In certain embodiments all of the class vectors 302a-302n of the reference library are combined into a class matrix such as the class matrix 308 illustrated in FIG. 3D. As discussed above, in certain embodiments a record set containing fewer than all of the reference records 212 in the reference library is used to perform the PMA. Therefore, in some embodiments the class matrix 308 contains only the class vectors 302 of the reference records 212a-212n used in record set. One of skill in the art will recognize that in certain embodiments there maybe any number of class vectors 302 containing any number of class identifiers 304. Further, as discussed above, one of skill in the art will recognize that the reference library may contain any number of reference records 212.

Figure 4:
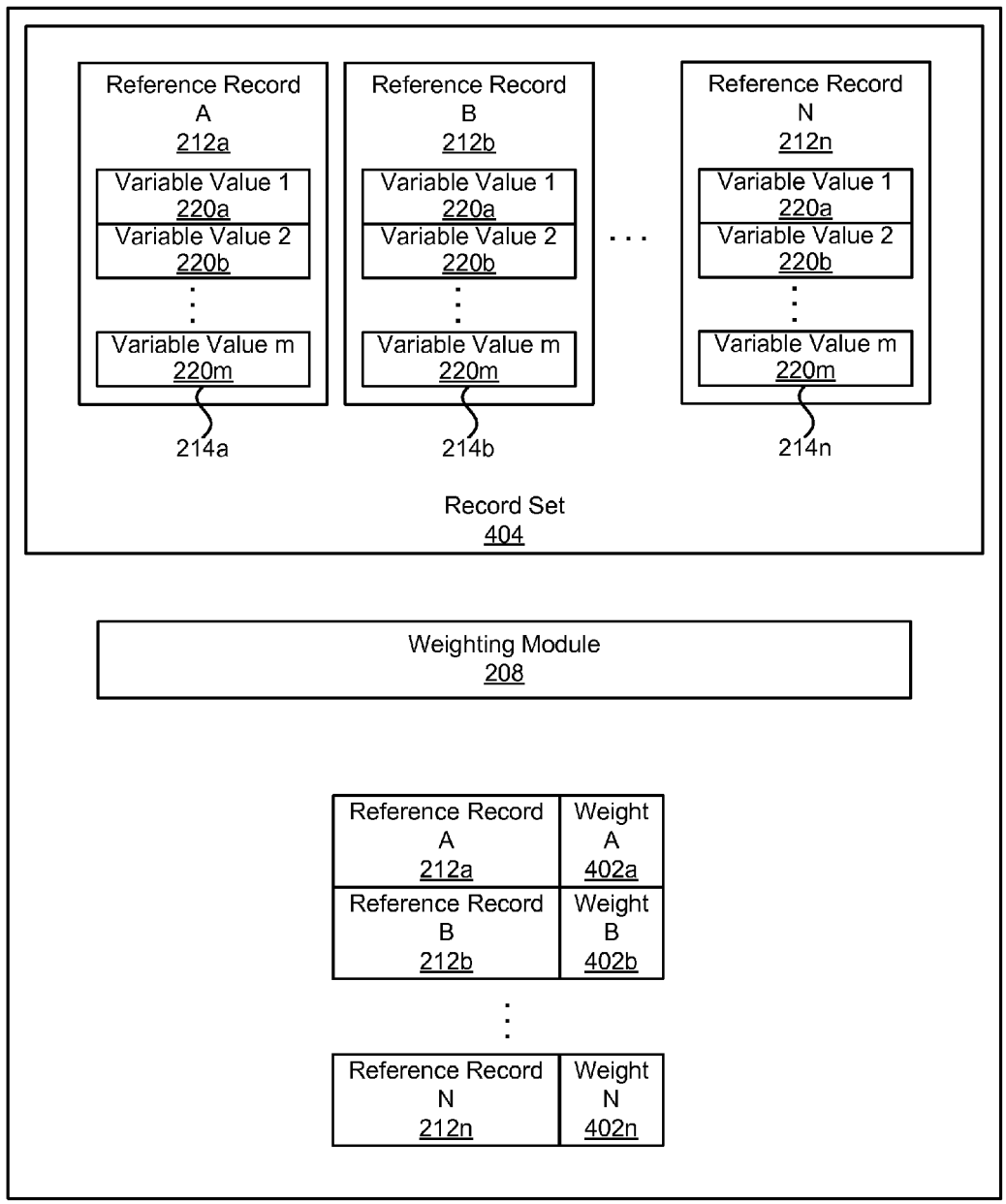
FIG. 4 is a schematic block diagram illustrating one embodiment of the weighting module of FIG. 2 in accordance with the present invention.

FIG. 4 illustrates the weighting module 208 of FIG. 2. The weighting module 208 calculates a set of unknown-class record weights 402 to apply to the unknown-class record 216. To calculate the set of unknown-class record weights 402, the weighting module 208 creates a model of the unknown-class record 216 by calculating a weighted average of the independent variable values 220 making up the set of independent variables 214 for each reference record 212. The weighted average has a weight corresponding to each of the reference records 212 used to calculate the weighted average. In certain embodiments the weighted average is calculated from all of the reference records 212 in the reference library. In other embodiments, a record set 404 containing less than all of the reference records 212 in the reference library is used to calculate the weighted average. In another embodiment the number of reference records 212 contained in the record set 404 is about one half the number of independent variables values 220 for each reference record 212.

The unknown-class record weights 402 are calculated as a weighted sum of the independent variable values 220 of the of the reference records 212 that, when multiplied by the values of the independent variables 220 of reference records 212, approximate the independent variable values of the independent variables 222 of the unknown-class record 216. The unknown-class record weights 402 are determined by the independent variable values 222 of the unknown-class record 216 in conjunction with variable values 220 for the reference records 212. Therefore, the resulting weights are dynamic in that they are different for each unknown-class record 216 analyzed.

Mathematically speaking, the weighting module 208 analyzes a vector of independent variable values 222 for the unknown-class record 216 to produce, for one embodiment, a set of unknown-class record weights 402 arranged in a vector that, when multiplied by the vector of independent variable values 220 of the reference records 212, approximate the set of independent variable values 222 for the unknown-class record 216 according to Formula 1:

$$W=(R^TR)^{-1}R^TX \quad \text{Formula 1}$$

where R is a matrix of the vectors of independent variable values 220 of the unknown-class record 216. In certain embodiments the matrix of independent variables values R is a non-square matrix. In this embodiment the vector W of reference record weights 402 is calculated such that Y=RW where Y is a vector identifying an approximation of the independent variable values in the unknown-class record 216. One skilled in the art will recognize that the superscript "T" in Formula 1 indicates the transpose of the non-square matrix of the vectors of independent variable values 220. Similarly, one of skill in the art will recognize that the superscript "−1" indicates the inverse of the ($R^TR$) matrix. And one of skill in the art will recognize that the elements of R, X and Y should, in certain embodiments, be transformed by operations such as scaling and shifting in a consistent manner in order that the equations just identified achieve accurate results.

In one embodiment there are substantially more independent variable values 220 for the reference records 212 than there are reference records 212. Therefore, in certain embodiments the matrix R of independent variable values 220 for reference records 212 has substantially more rows than columns. In one embodiment, for mathematical convenience, the record set 404 contains substantially fewer reference records 212 than the entire reference library. In another embodiment the number of reference records 212 included in the record set 404 is about one half of the number of independent variables 220 in a single reference record 212.

In certain embodiments the unknown-class record weights 402 may be arranged in a vector with each unknown-class record weight 402 corresponding to a reference record 212. Thus, in the example illustrated in FIG. 4, if there are only three reference records, reference record A 212a, reference record B 212b, and reference record N 212n produce three weights, weight A 402a, weight B 402b, and weight N 402n. Weight A 402a corresponds to reference record A 212a, weight B 402b corresponds to reference record B 212b, and weight N 402n corresponds to reference record N 212n. In certain embodiments each reference record 212 results in a calculated weight such as weights 402. In other embodiments a particular reference record may not contribute to the model and thus the weight for that particular reference record may be zero. In one embodiment an unknown-class record weight 402 corresponding to a reference record 216 that does not contribute to the model may be excluded from the vector of unknown-class record weights 402.

Figure 5:
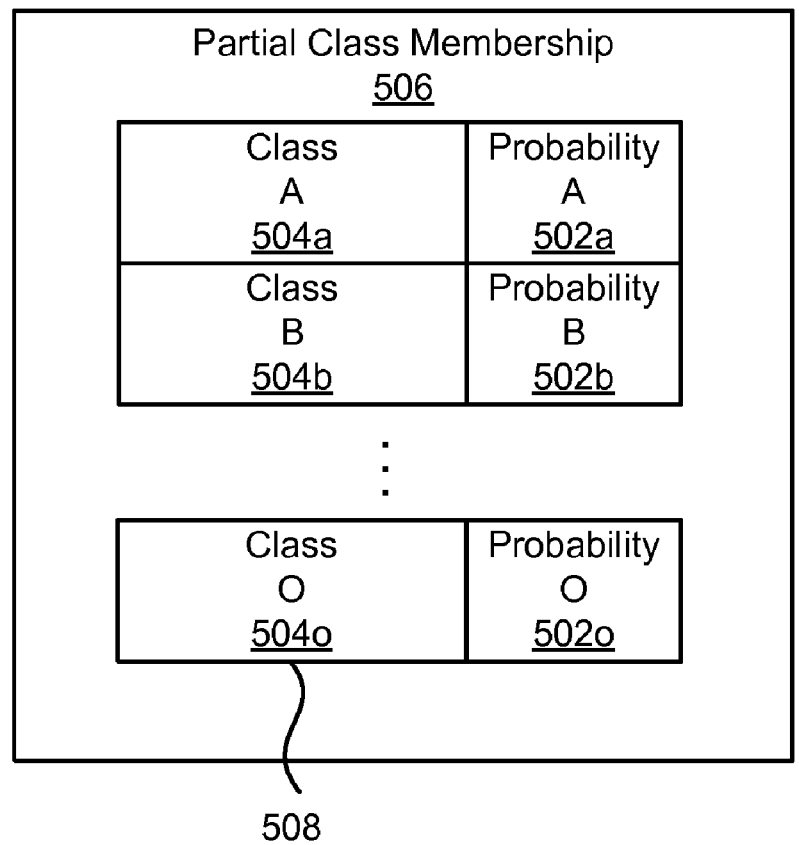
FIG. 5 is a schematic block diagram illustrating one embodiment of the classification module of FIG. 2 in accordance with the present invention.

FIG. 5 illustrates one embodiment of a partial class membership vector 506 calculated by the classification module 210 of FIG. 2. In certain embodiments the partial class membership vector 506 identifies the partial class membership 502 for each class 504. The partial class memberships 502 may be interpreted as the probability that the unknown-class record 216 is a member of each possible class 504. The partial class memberships 502 are calculated by weighting the class vectors 302 created by the class identification module 206 with the unknown-class record weights 402 created by the weighting module 208 and summing the results in a partial class membership vector 506. Each partial class membership 502 corresponds to a class 504 from the group of classes 508. In certain embodiments the partial class membership vector 506 is created according to Formula 2:

$$P=CW \quad \text{Formula 2}$$

Where C is a matrix of the class vectors 302 of the record set 404 created by the class identification module 206 and W is a vector of the unknown-class record weights 402 corresponding to each reference record 212 created by the weighting module 208. Because the unknown-class record weights 402 are constrained to be greater than or equal to zero, less than or equal to one, and sum to no more than one, the partial class memberships 502 for each class 504 have values between zero and one. These partial class memberships 502 can be interpreted as the probability that the unknown-class record 216 belongs to each class 504. In certain embodiments the class 504 corresponding to the highest partial class membership 502 is considered the class 504 of the unknown-class record 216. In other embodiments the unknown-class record 216 may be considered to belong to a class 504 if the partial class membership 502 for the particular class 504 is higher than a predefined threshold. In certain embodiments the predefined threshold may be varied to produce a greater or lesser number of classes 504 as the classes 504 of the unknown-class record 216.

The partial class memberships 502 are determined by multiplying the class vector 302 for a particular reference record 212 onto the unknown-class record weight 402 for that particular reference record 212. For example, where the weighting module 208 calculates three weights, weight A 402a corresponding to reference record A 212a, weight B 402b corresponding to reference record B 212b, and weight N 402n corresponding to reference record N 212n, the classification module 210 calculates a partial class membership 502 for each class 504 in the group of classes 508 by multiplying weight A 402a with the class vector 302a for reference record A, multiplying weight B 402b with the class vector 302b for reference record B 212b, and multiplying weight N 402n with the class vector 302n for reference record N 212n. The results are combined into the partial class membership vector 508 which has a partial class membership 502 corresponding to each class 504 in the group of classes 508. The partial class memberships 502 may be interpreted as the probability that the unknown-class record 216 belongs to a particular class 504.

Figure 6:
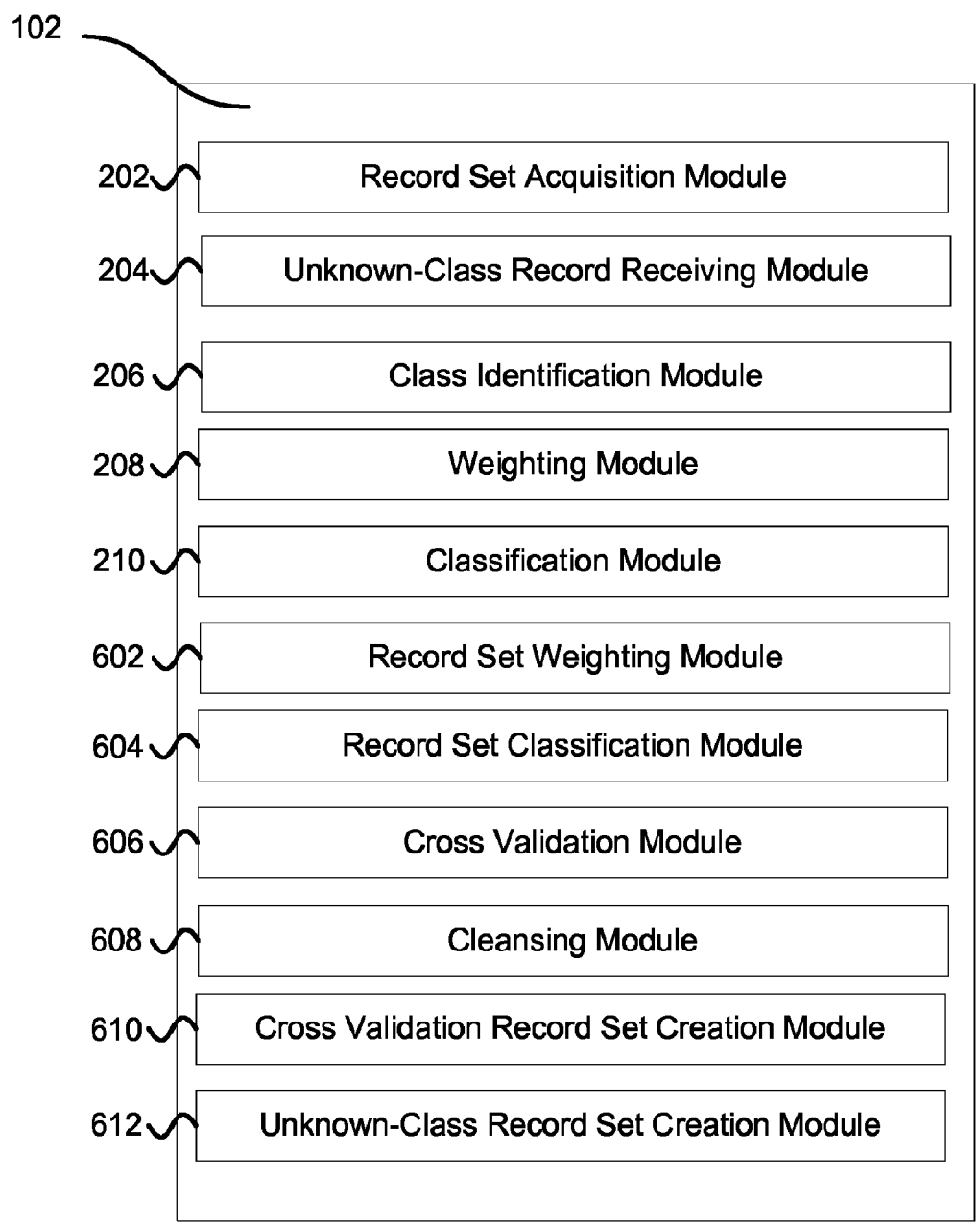
FIG. 6 is a schematic block diagram illustrating another embodiment of the partial class membership apparatus of FIG. 1 in accordance with the present invention.

FIG. 6 illustrates another embodiment of the partial class membership apparatus 104 having a record set acquisition module 202, an unknown-class record receiving module 204, a class identification module 206, a weighting module 208, a classification module 210, a record set weighting module 602, a record set classification module 604, a cross-validation module 606, a cleansing module 608, a cross-validation record set creation module 610, and a unknown-class record set creation module 612.

The record set acquisition module 202, unknown-class record receiving module 204, class identification module 206, weighting module 208, and classification module 210 of FIG. 6 are substantially similar to the record set acquisition module 202, unknown-class record receiving module 204, class identification module 206, weighting module 208, and classification module 210 of FIG. 2 described above.

In the embodiment illustrate in FIG. 6, the record set weighting module 602 calculates a set of reference record weights for a tested reference record from the reference library by selecting one of the reference records 212 as a tested reference record. For example, reference record A 212a may be selected as the tested reference record. The record set weighting module 602 analyzes a vector of the independent variable values 220 of the tested reference record (reference record A 212a in this example) to produce a set of reference record weights arranged in a vector that, when multiplied by the vector of independent variable values 220 of the remaining reference records (reference records B-N 212b-212n in this example), approximate, in one embodiment, the set of independent variable values 220 for the tested reference record (reference record A 212a in this example) according to Formula 3:

$$W' = (R'^T R')^{-1} R'^T X'$$ Formula 3

Where R' is a matrix of the vectors independent variable values 220 of the remaining reference records B-N 212b-212n and X' is a vector of independent variable values 220 of the tested reference record A 212a. In certain embodiments R' is a non-square matrix of the vectors of independent variable values 220 of the remaining reference records B-N 212b-212n. In one embodiment the vector W' of tested reference record weights is calculated such that Y'=R'W' where Y' is a vector identifying an approximation of the independent variable values in the tested reference record X'. One skilled in the art will recognize that the superscript "T" in Formula 3 indicates the transpose of the non-square matrix of the vectors of independent variable values 220. Similarly, one of skill in the art will recognize that the superscript "−1" indicates the inverse of $(R'^T R')$. And one of skill in the art will recognize that the elements of R', X' and Y' should, in certain embodiments, be transformed by operations such as scaling and shifting in a consistent manner in order that the equations just identified achieve accurate results. In this example the reference record A 212a is selected as the tested reference record. In other embodiments the record set weighting module 602 calculates a set of weights for each of the reference records A-N 212a-212n. Thus, in certain embodiments each of the reference records A-N 220a-220m is used as a tested reference record at least once. In other embodiments only the reference records 212 that are included in the record set 404 are used as a tested reference record. One of skill in the art will recognize that the record set weighting module 602 may calculate the set of reference record weights for the tested reference record using a least squares vector element model, a support vector model, a neural network model, a kernel regression model or other weighting model as is known in the art. Further, one skilled in the art will recognize that the record set weighting module 602 may calculate the set of reference record weights in a manner substantially similar to the manner in which the weighting module 208 calculates the set of unknown-class record weights 402 described above.

The record set classification module 604 creates a tested reference record partial class membership vector identifying the probability that the tested reference record (reference record A 212a in the example above) is a member of each possible class by weighting each of the remaining class vectors (class vectors B-N 302b-302n where reference record A 212a is the tested reference record) with the weights created by the record set weighting module 602. In certain embodiments the tested reference record partial class membership vector is created according to Formula 4:

$$P' = C'W'$$ Formula 4

Where C' is a tested reference record set class matrix containing the remaining class vectors (class vectors B-N P302b-302n where reference record A 212a is the tested reference record) of the record set 404 and W' is the vector of tested reference record weights corresponding to each of the remaining reference record 212. Because the tested reference record weights are greater than or equal to zero, less than or equal to one, and sum to no more than one, the values for the tested reference record partial class memberships are between zero and one. The values for the tested reference record partial class membership can be interpreted as the probability that the tested reference record (reference record A 212a in the example above) belongs to each class. In certain embodiments the class corresponding to the highest value for the tested reference record partial class membership is considered the class of the tested reference record (reference record 212a in the example above). In other embodiments the tested reference record (reference record 212a in the example above) may be considered to belong to a class if the value for the tested reference record partial class membership for the particular class is higher than a predefined threshold.

The cross-validation module 606 compares the tested reference record partial class membership vector created by the record set classification module 604 with the known class of the tested reference record to determine whether the record set classification module 604 has correctly identified the known class of the tested reference record. In certain embodiments the cross-validation module 606 determines that the record set classification module 604 has correctly identified the known class of the tested reference record if the partial class membership corresponding to the known class in the tested reference record partial class membership vector has the highest value for the tested reference record partial class membership vector with respect to the other reference record partial class memberships. In other embodiments the cross-validation module 406 determines that the record set classification module 604 has correctly identified the known class of the tested reference record if the partial class membership corresponding to the known class in the tested reference record partial class membership vector has a value higher than a known partial class membership threshold. In another embodiment the threshold may be defined after the record set classification module 604 has created the reference record partial class membership vector so that the partial class memberships for each class in the reference record partial class membership vector can be compared with one another.

The cleansing module 608 removes a tested reference record from the record set where the cross-validation module 606 determines that the record set classification module 604 has incorrectly identified the known class of the tested reference record. In certain embodiments the cleansing module 608 removes the tested reference record from the reference library. In other embodiments the cleansing module only removes the tested reference record from the record set while leaving the tested reference record in the reference library.

The cross-validation record set creation module 610 creates a unique cross-validation record set by selecting a number of reference records 212 that contain independent variable values 220 that are nearest neighbors to the independent variable values 220 of the tested reference record. In certain embodiments the number of reference records 212 that are selected for the unique cross-validation record set is less than or equal to the number of independent variable values 220 for a single reference record 212. In one embodiment the record set weighting module 602 calculates the set of reference record weights for a tested reference record using the unique cross-validation record set created by the cross-validation record set creation module 610.

The cross-validation record set creation module 610 selects, in one embodiment, the reference records 212 for the record set by comparing a sum of square differences calculated for each reference record 212 in the cross-validation record set to identify the reference records 212 in the reference library that are the nearest neighbors to the tested reference record. In certain embodiments the nearest neighbor reference records 212 selected for inclusion in the cross-validation record set are the reference records 212 with independent variable values $220a$-$220m$ that have the least sum of square differences when compared to the independent variable values of the tested reference record. In one embodiment the sum of square differences is calculated as a difference between the independent variable values of the tested reference record and the independent variable values for the reference records 212 that make up the cross-validation record set. In one embodiment the number of reference records $212a$-$212n$ selected for inclusion in the cross-validation record set is equal to about one half of the number of independent variables 220 in a single reference record 212. For example, if reference record A 212a has 20 independent variables, the number of reference records 212 that make up the cross-validation record set is 10. In other embodiments the number of reference records 212 that make up the cross-validation record set is equal to or less than the number of independent variables in a single reference record such as reference record A 212a. Thus, in certain embodiments if reference record A 212a has 20 independent variables, the number of reference records in the cross-validation record set is equal to or less than 20. One of skill in the art will recognize that because the reference records 212 ordinarily have the same number of independent variables, the number of reference records 212 making up the cross-validation record set can be identified by determining the number of independent variables in any of the reference records 212.

In certain embodiments the unknown-class record set creation module 612 creates an unknown-class record set that the weighting module 208 uses to calculate the set of unknown-class record weights for the unknown-class record 216. In one embodiment the unknown-class record set creation module 612 creates the unknown-class record set in a manner substantially similar to the way the cross-validation record set creation module 610 creates the cross-validation record set. That is, in certain embodiment the unknown-class record set creation module 612 selects a number of reference records 212 in the reference library that have independent variable values 220 that are nearest neighbors to the independent variable values 222 of the unknown-class record 216. In one embodiment the number of reference records 212 selected for inclusion in the unknown-class record set is less than or equal to the number of independent variables in the unknown-class record 216. In another embodiment the number of reference records 212 in the unknown-class record set is equal to about one half the number of independent variables 222 in the unknown-class record 216.

The unknown-class record set creation module 612 selects the reference records 212 for inclusion in the unknown-class record set by comparing the sum of square differences between the independent variable values 220 for each reference record 212 and the independent variable values $222a$-$222m$ of the unknown-class record 216. In certain embodiments the reference records 212 that have the least sum of square differences between their independent variable values $220a$-$220m$ and the independent variable values $222a$-$222m$ of the unknown-class record 216 are include in the unknown-class record set.

Figure 7:
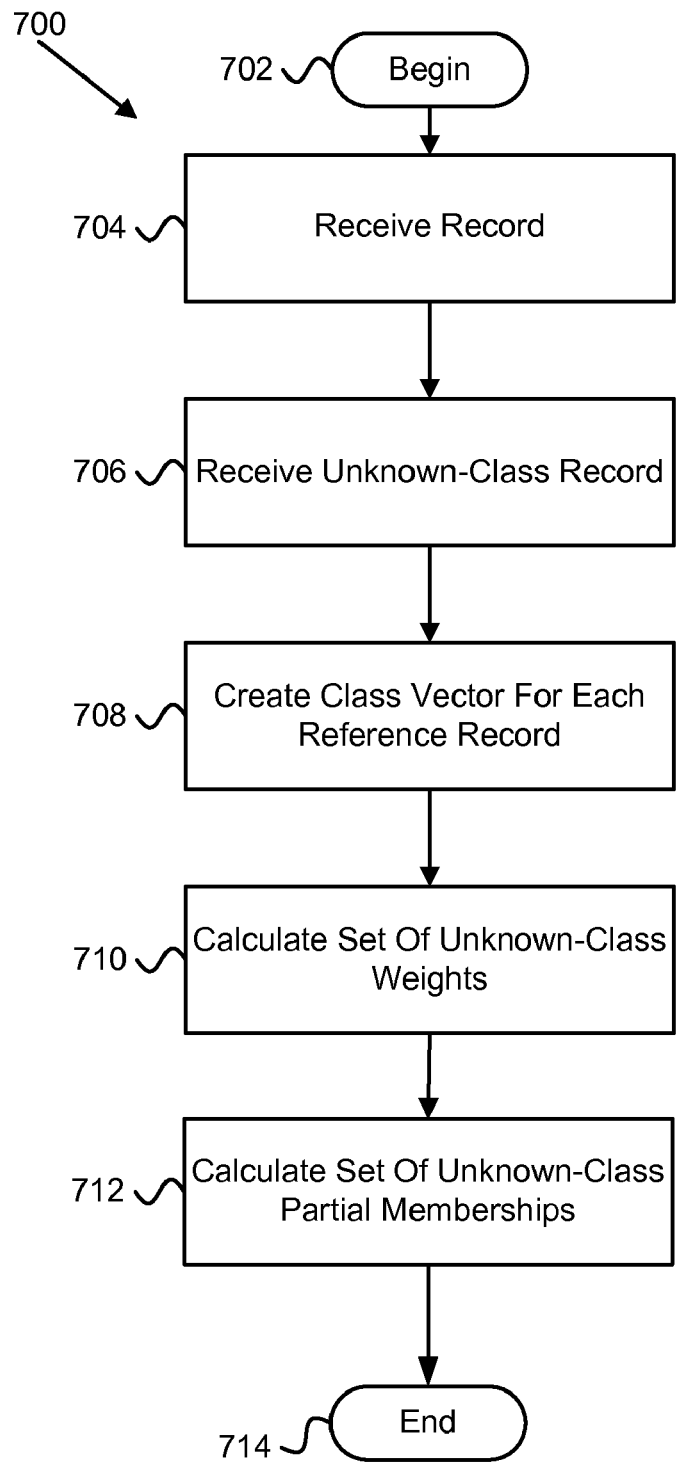
FIG. 7 is a schematic flow chart diagram illustrating one embodiment of a method for determining a partial class membership of a data record in a class in accordance with the present invention.

FIG. 7 illustrates a method 700 for determining a class of an unknown-class record 216 according to one embodiment of the current invention. The method 700 begins 702 and the record set acquisition module 202 receives 704 a set of reference records 212. In one embodiment the record set acquisition module 202 receives the entire reference record library. In another embodiment the record set acquisition module only receives a record set 404 containing fewer than all of the reference records 212 in the reference library. As discussed above, each reference record 212 has a set of independent variables 214 having independent variable values 220. Each reference record 212 in the set of records received 202 by the record set acquisition module 202 has the same set of independent variables 214 as the remaining reference records 212. In one embodiment each reference record 212 belongs to a known class 504 within a group of classes 508. In another embodiment each reference record 212 belongs to one or more known classes 504 within the group of classes 508.

An unknown-class record 216 is received 706 by the unknown-class record receiving module 204 of the partial class membership apparatus 104. The unknown-class record 216 has a same set of independent variables 218 as the set of independent variables 214 of the reference records 212. One of skill in the art will recognize that while the set of independent variables 218 of the unknown-class record 216 and the sets of independent variables 214 for each reference record 212 are the same, the independent variable values 220 and the independent variable values 222 may be different.

In certain embodiments a class vector 302 is created 708 for each reference record 212 by the class identification module 206 of the partial class membership apparatus 104. The class vector 302 is created 508 by setting a class identifier 304 to a first value if the known class of the reference record 212 is a member of the corresponding class. If the reference record 212 is not a member of a particular class, the class identifier 304 is set to a second value. In certain embodiments the class identification module 206 uses binary identifiers as the class identifiers 304 such that the first value, indicating that the reference record 212 is a member of a particular class, is a one and the second value, indicating that the reference record 212 is not a member of a particular class, is a zero. Thus, in certain embodiments the class vectors 302 are binary and include a single one in place of the class identifier 304 corresponding to the known class of the particular reference record 212 with the remaining class identifiers 304 containing a zero. A set of unknown-class record weights 402 are calculated 710 as a weighted sum of the independent variable values 220 for the reference records 212 in the record set 404 that, when multiplied by the independent variable values 222 for the unknown-class record 216, approximate the set of independent variable values 222 for the unknown-class record 216. In certain embodiments the set of unknown-class record weights 402 includes an unknown-class record weight 402 for each reference record 212 in the record set 404. In another embodiment, one or more reference record 212 in the record set 404 may not contribute to the approximation of the set of independent variable values 222 for the unknown-class record 216. Therefore, in certain embodiments an unknown-class record weight 402 calculated 510 for a particular reference record 212 may be zero. In such embodiment, the unknown-class record weight 402 that is zero may be excluded from the set of unknown-class record weights 402.

In certain embodiments the method 700 may be constrained so that each weight 402 in the set of unknown-class record weights 402 has a value greater than or equal to zero and less than or equal to one. In one embodiment the method 700 maybe constrained so that the sum of the set of unknown-class record weights 402 is less than or equal to one.

A partial class membership 502 is determined 712 for each class 504 in the group of classes 508 that the unknown-class record 216 may belong to. The partial class memberships 502 are determined 712 by multiplying each unknown-class record weight 402 in the set of unknown-class record weights 402 by the class vector 302 corresponding to that unknown-class record weight 402 and summing the result into a partial class membership vector 506. For example, if the record set 404 contains three reference records 212, reference record A 212a, reference record B 212b, and reference record N 212n, the weighting module 208 calculates unknown-class record weights 402, unknown-class record weight A 402a, unknown-class record weight B 402b, and unknown-class record weight N 402n corresponding to the reference records A 212a, B 212b, and N 212n respectively. The results are combined into a partial class membership vector 506 with each partial class membership 502 representing the probability that the unknown-class record 216 belongs to each corresponding class 504 in the group of classes 508. The method then ends 714.

EXAMPLE 1

As an example, PMA was used to identify memberships of test data in one of three classes to illustrate that PMA effectively and simultaneously identifies the correct memberships. In this example one thousand one hundred and fifty nine reference records (similar to reference records 212 of FIG. 2) were used as a reference library. Each of the reference records had nine independent variables (similar to independent variables 220 of FIG. 2) arranged in reference data vectors (similar to the set of independent variables 214 of FIG. 2). The independent variables determined three different classes (similar to the classes 504 of FIG. 5). These were separated into five hundred and seventy nine reference records 212 having five hundred and seventy nine class vectors 302, and five hundred and eighty test reference records and five hundred and eighty corresponding test class vectors. To test the effectiveness of PMA the five hundred and eighty test reference records were treated as unknown-class records 216. The five hundred and seventy nine reference records 212 and the five hundred and eighty test reference records (treated as unknown-class records 216) each had (approximately) one third of the records in the first class, one third of the records in the second class, and one third of the records in the third class. Thus, the group of classes 508 included a first, second and third classes as classes 504. Each of the five hundred and eighty test reference records (treated as unknown-class records 216) were modeled as described above, and a predicted partial class membership vector 506 was created and compared to the known class vector for the tested reference record to determine the effectiveness of PMA.

The technique used to produce the model for the test reference records was based on least-squares where the nine independent variables 220 first determined an optimal fit (Formula 3) to the test data. The model metric used in this example was the Euclidian distance squared between the independent variable values 222 of the test reference records (treated as the unknown-class record 216) and the independent variable values 220 of the reference records 212. For this example five reference records 212 were chosen for the record set 404 for each of the five hundred and eighty test reference records. Five reference records 212 were chosen because this number was approximately one half of the set of nine independent variables 214 contained in each reference record 212. All of the remaining reference records were assigned weights of zero for modeling purposes.

Each of the five hundred and eighty test reference records (similar to the unknown-class record 216) were modeled against the corresponding record sets 404 to calculate weights (similar to the unknown-class record weights 402). The resulting weights (similar to the unknown-class record weights 402) were forced to all individually be greater than or equal to zero, less than or equal to one and to sum to one, in a non-optimal manner. The class vectors 302 corresponding to each of the reference records 212 in each record set 404 were applied to each of the calculated weights (similar to the unknown-class record weights 402) having a value greater than zero to create a predicted partial class membership vector. Each value in the predicted partial class membership vector was interpreted as the probability that the particular test reference record belonged to the corresponding class. The predicted partial class membership vector was compared (Formula 4) with the known-class vector for the particular test reference record to determine the effectiveness of PMA.

Figure 8A:
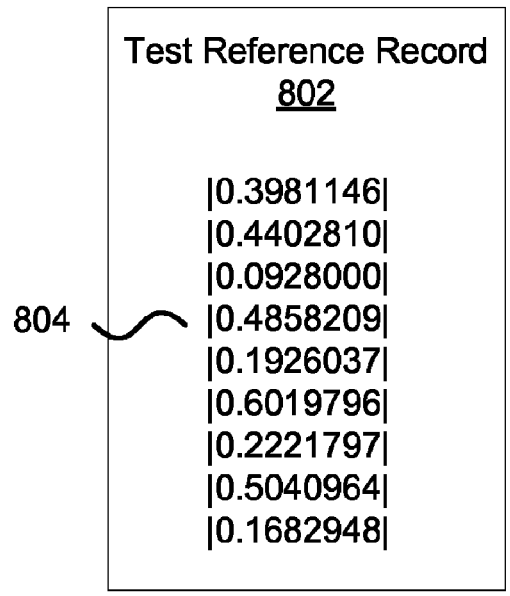
FIG. 8A is a schematic block diagram illustrating one embodiment of a test reference record in accordance with the present invention.

FIG. 8A illustrates a test reference record 802 containing a set of nine independent variable values arranged in a vector 804. For the purpose of this example the test reference record 802 was treated as the unknown-class record 216 described above even though the class of the test reference record 802 was known.

Figure 8B:
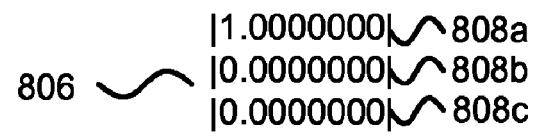
FIG. 8B is a schematic block diagram illustrating one embodiment of a class vector in accordance with the present invention.

FIG. 8B illustrates a test class vector 806 with identifiers 808a-808c identifying the known class of the test reference record 802. The first class, corresponding to identifier 808a, is shown as a one in FIG. 8B. Identifier 808b, corresponding to the second class, and identifier 808c, corresponding to the third class, show zeros. Therefore, the known class of the test reference record 802 is the first class.

FIG. 9A illustrates a matrix 902 containing the independent variable values of the five nearest neighbor reference records. Each column A-E of the matrix 902 contains the independent variable values for one of the nearest neighbor reference records. In this example there are five columns A-E correlating to the five reference records having independent variable values that are the nearest neighbors to the independent variable values of the test reference record 902.

FIG. 9B illustrates a matrix 904 having class vectors 906a-906e identifying the known-class for each of the nearest neighbor reference records corresponding to columns A-E of the matrix 902. Thus, the reference records corresponding to column A, column B, and Column E are members of the first class because the identifiers for the first class for each of these reference records are set to a one with the remaining class identifiers for each of these reference records set to a zero. The reference record corresponding to column C has the identifier for the second class set to a one with the identifiers for the first class and the third class set to a zero. Therefore, the reference record corresponding to column C is a member of the second class. Finally, the reference record corresponding to column D has the identifier for the third class set to a one with the first and second class identifiers set to zero. Therefore, the reference record corresponding to column D is a member of the third class.

FIG. 10 illustrates a vector 1002 of weights 1004a-1004e calculated for the five nearest neighbor reference records. The weights 1004a-1004e are produced using the independent variable values contained in the vector 804 of the test reference record 802 in conjunction with the independent variable values of the five nearest neighbor references contained in the matrix 902. Each weight 1004 corresponds to one of the five nearest neighbor reference records. Thus, the first weight 1004a corresponds to the reference record having the independent variable values in column A of matrix 902 illustrated in FIG. 9A. The second weight 1004b corresponds to the reference record having the independent variable values in column B of matrix 902. The third weight 1004c corresponds to the reference record having the independent variable values in column C of matrix 902. The fourth weight 1004d corresponds to the reference record having the independent variable values in column D of matrix 902. Finally, the fifth weight 1004e corresponds to the reference record having the independent variable values in column E of matrix 902. The fifth weight 1004e corresponding to the reference record having the independent variable values in column E of matrix 902 is zero. In certain embodiments this indicates that the reference record having the independent variable values in column E does not contribute to the model. Therefore, the reference record having the independent variable values in column E is not weighted in determining the partial class memberships for each class.

The weights were calculated according to Formula 1, $W=(R^T R)^{-1} R^T X$ described above and where R is the matrix 902 of independent variable values for the five nearest neighbor reference records and X is the vector 804 of independent variable values for the test reference record 802. In certain embodiments the elements of R and X are transformed as necessary by scaling and shifting in a consistent manner in order that the equation for W is accurate.

FIG. 11 illustrates the calculations performed to determine the partial class memberships 1102a, 1102b, and 1102c for the first class, second class, and third class respectively. The partial class memberships 1102a-1102c are calculated according to Formula 2, $P=CW$ described above and where C is the matrix 904 of class vectors 906a-906e identifying the known-class for each of the nearest neighbor reference records corresponding to columns A-E of the matrix 902 and W is the vector 1002 of weights 1004a-1004e calculated for the five nearest neighbor reference records. The partial class memberships 1102a, 1102b, and 1102 c are arranged in a partial class membership vector 1104 with the first partial class membership 1102a corresponding to the first class, the second partial class membership 1102b corresponding to the second class, and the third partial class membership 1102c corresponding to the third class. These partial class memberships may be interpreted as the probability that the tested reference record 802 belongs to each class. Thus, because the first partial class membership 1102a is the highest with respect to the second and third partial class memberships 1102b and 1102c (0.5955213 compared to 0.2454118 and 0.1590669) the predicted membership, according to PMA, is the first class. As discussed above the test class vector 806 of FIG. 8B shows that the known class for the test reference record 802 is the first class. Therefore, the predicted partial class membership using PMA correctly identified the known class of the test reference record 802.

In performing the calculations of Formula 2 to determine the partial class memberships 1102a-1102c, the each weight 1004a-1004d is multiplied by the corresponding class vector 906a-906d and the results are summed as the partial class membership vector 1104. Thus, the first weight 1004a is multiplied by the class vector 906a of the reference record with the independent variable values corresponding to column A, the second weight 1004b is multiplied by the class vector 906b of the reference record with the independent variable values corresponding to column B, the third weight 1004c is multiplied by the class vector 906c of the reference record with the independent variable values corresponding to column C, and the fourth weight 1004d is multiplied by the class vector 906d of the reference record with the independent variable values corresponding to column D. Because the reference record with the independent variable values corresponding to column E resulted in a weight 1004e of zero, both the weight 1004e and class vector 906e were not used in the partial class membership calculation.

Figure 12:
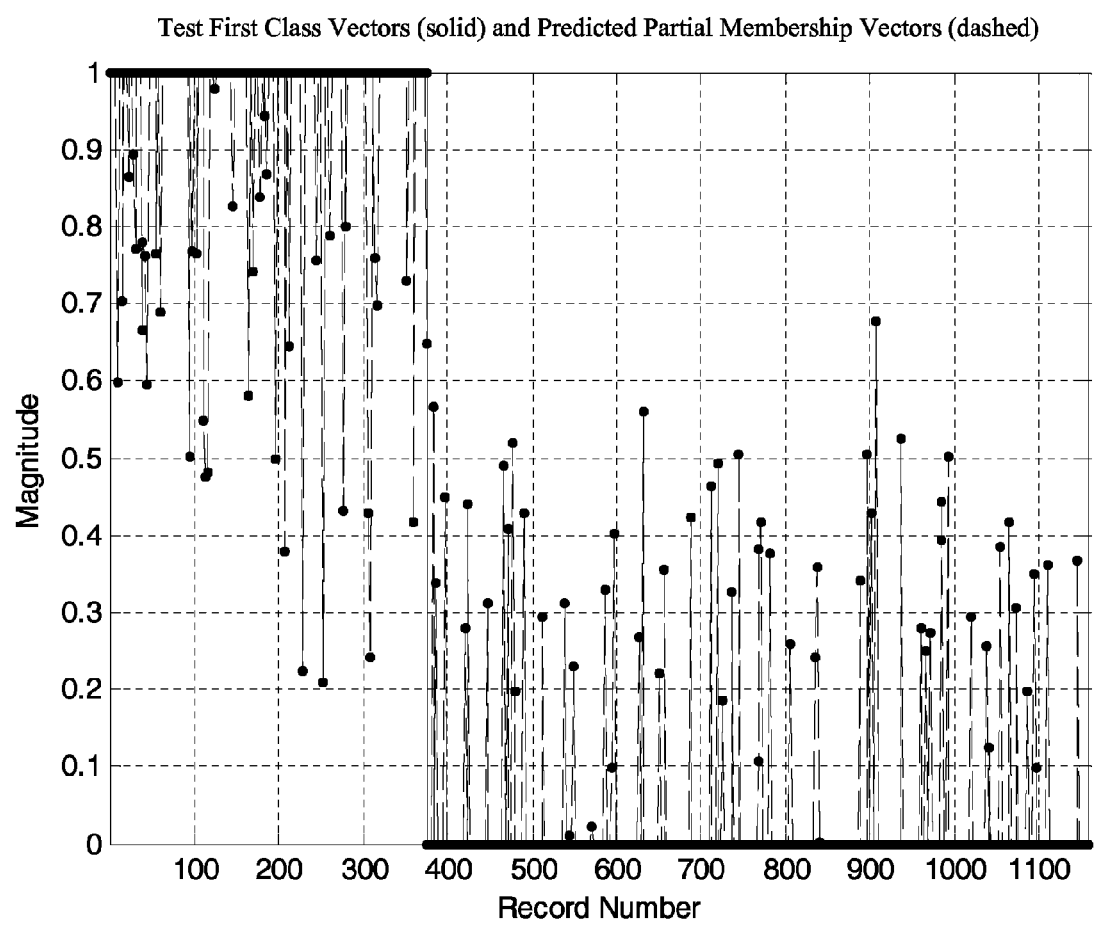
FIG. 12 is a chart comparing a predicted partial class membership vector using partial class membership analysis and a test class vector for a first class in accordance with one embodiment of the present invention.
Figure 13:
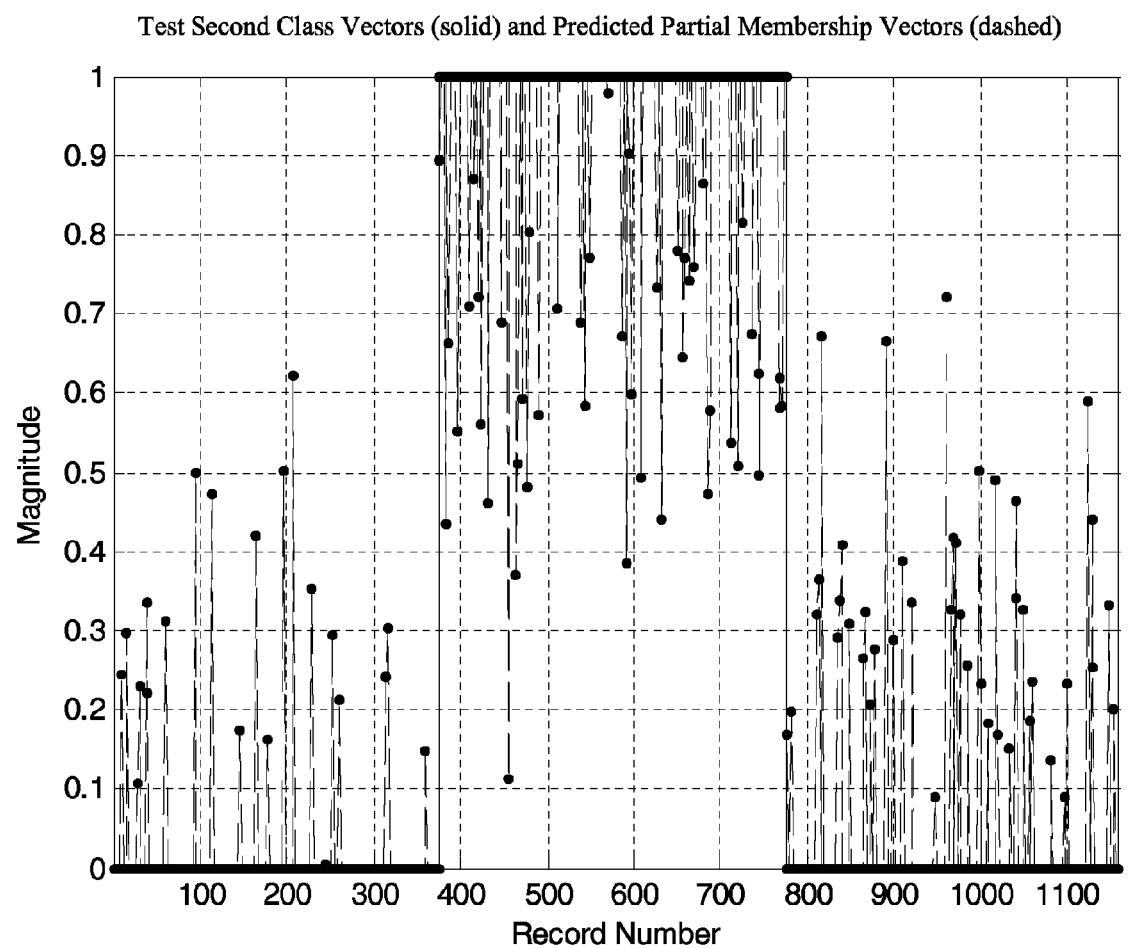
FIG. 13 is a chart comparing a predicted partial class membership vector using partial class membership analysis and a test class vector for a second class in accordance with one embodiment of the present invention.
Figure 14:
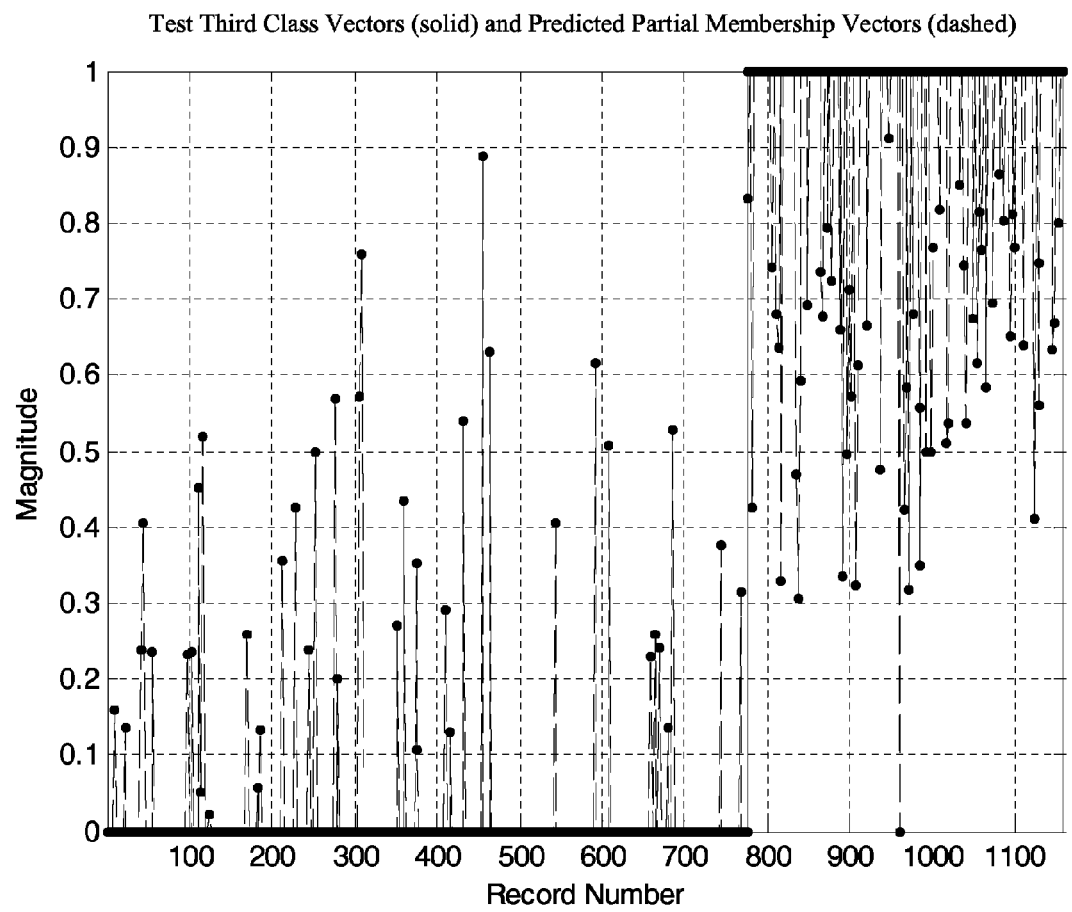
FIG. 14 is a chart comparing a predicted partial class membership vector using partial class membership analysis and a test class vector for a third class in accordance with one embodiment of the present invention.

This specific partial class membership vector 1104 is only appropriate for the test reference record 802. The complete results of the reference library applied to all 580 test data vectors are shown in FIGS. 12, 13 and 14. In each figure values of the predicted partial class membership vectors and values of the test class vectors are shown. FIG. 12 compares predicted partial class membership vectors and test class vectors for the first class, FIG. 13 compares predicted partial class membership vectors and test class vectors for the second class, and FIG. 14 compares predicted partial class membership vectors and test class vectors for the third class. FIG. 12 shows that the vast majority of the first class test data vectors were correctly identified. Similarly, FIGS. 13 and 14 show that the vast majorities of the second class and the third class test data vectors were correctly identified. This is indicated visually and quantitatively by the fact that the predicted partial class membership vector values have a Pearson correlation coefficient of 0.94 with the test class vector values over all the values in FIGS. 12, 13 and 14.

Figure 15:
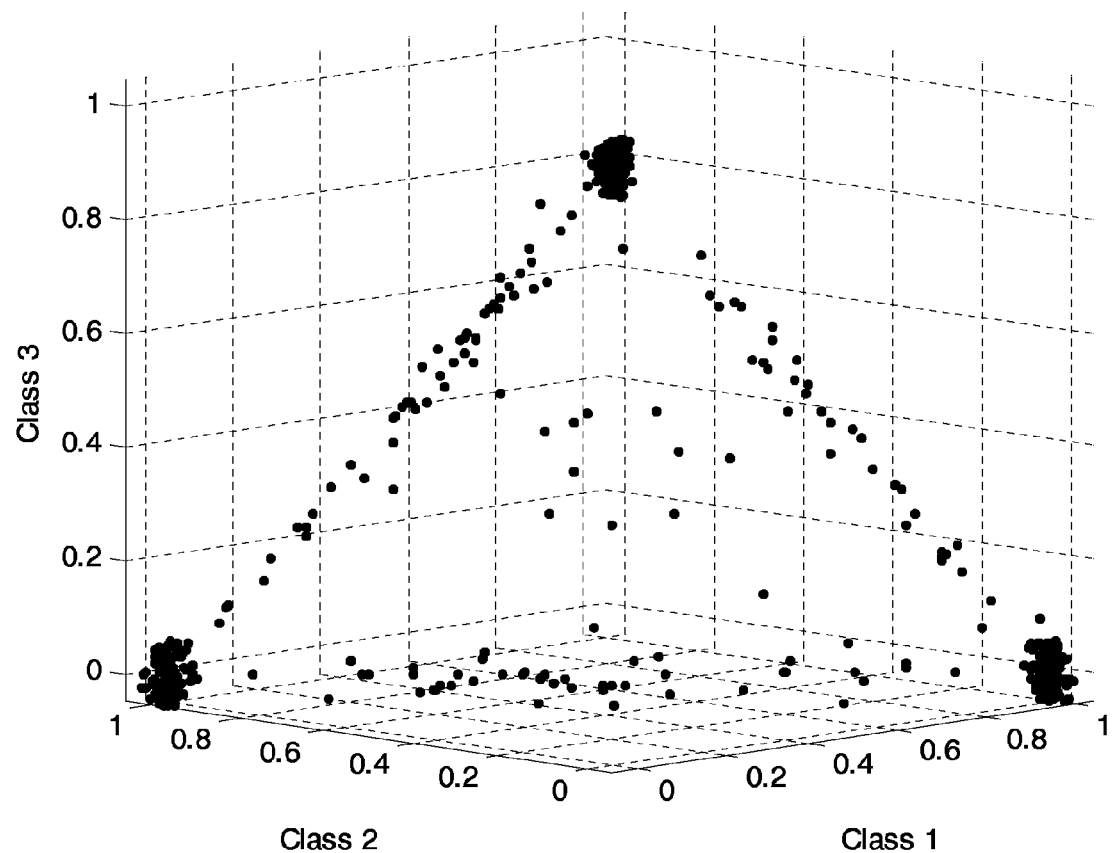
FIG. 15 is a chart comparing the partial class membership vectors for the first class, second class, and third class of FIGS. 12, 13 and 14 in accordance with one embodiment of the present invention.

FIG. 15 may be used to more fully assess the performance of PMA for the data contained in the 1159 reference records. In FIG. 15 the values of the three partial class membership vectors are plotted along three perpendicular axes. In this case 5% noise was added to the partial class memberships when they were equal to unity in order to be able see these values as more than a single dot. This figure shows clearly that any ambiguities between the first and second classes, lying along a line between the first and second classes, are not ambiguous with the third class. Any ambiguities between the second and third classes, lying along a line between the second and third classes, are not ambiguous with the first class. Any ambiguities between the first and third classes, lying along a line between the first and third classes, are not ambiguous with the second class. The only ambiguities that exist simultaneously between the first, second and third classes are the ten points in the central region of this figure.

EXAMPLE 2

In this example, data is analyzed for the response to a subsidized energy efficiency improvement program offered by a utility to its business customers. The data for participation in this program totals 1180 accounts with 590 that did participate and 590 that did not participate. Participation was characterized by the independent variables 1-40 shown in Table 1 above. The participation class identifier has a value of one if the customer participated in the program and a value of zero if the customer did not participate in the program. The non-participation class identifier has a value of zero if the customer participated in the program and a value of one if the customer did not participate in the program.

The 1180 accounts were first separated into 590 reference accounts and 590 test accounts. The reference set and the test set each contained 295 accounts that did participate and 295 accounts that did not participate. The 590 reference accounts were cleansed with the least-squares technique discussed above. The values for the independent variables 1-40 in Table 1 first determined an optimal fit for each of the reference data vectors using only the remaining reference data vectors. The model metric used in this example was the Euclidian distance squared between the independent variables of the test data vector and those of the reference data vectors. For this example 20 nearest-neighbor reference data vectors were chosen as a record set (half the number of independent variables). All of the remaining reference data vectors were assigned weights of zero for modeling purposes. The resulting weights were then forced to all individually be greater than or equal to zero and less than or equal to one. The weights were also forced to sum to one, in a non-optimal manner. Then the reference class vectors were applied to all weights greater than zero to create a predicted partial class membership vector. Of the reference records, there were 62 cleansed reference records generated for this example by requiring correct (within 25% of perfect) class identifications during cleansing. This means that the vast majority of the 590 un-cleansed reference accounts contained questionable entries, perhaps expected because of a weak link between participants and the variables listed in Table 1.

Figure 16:
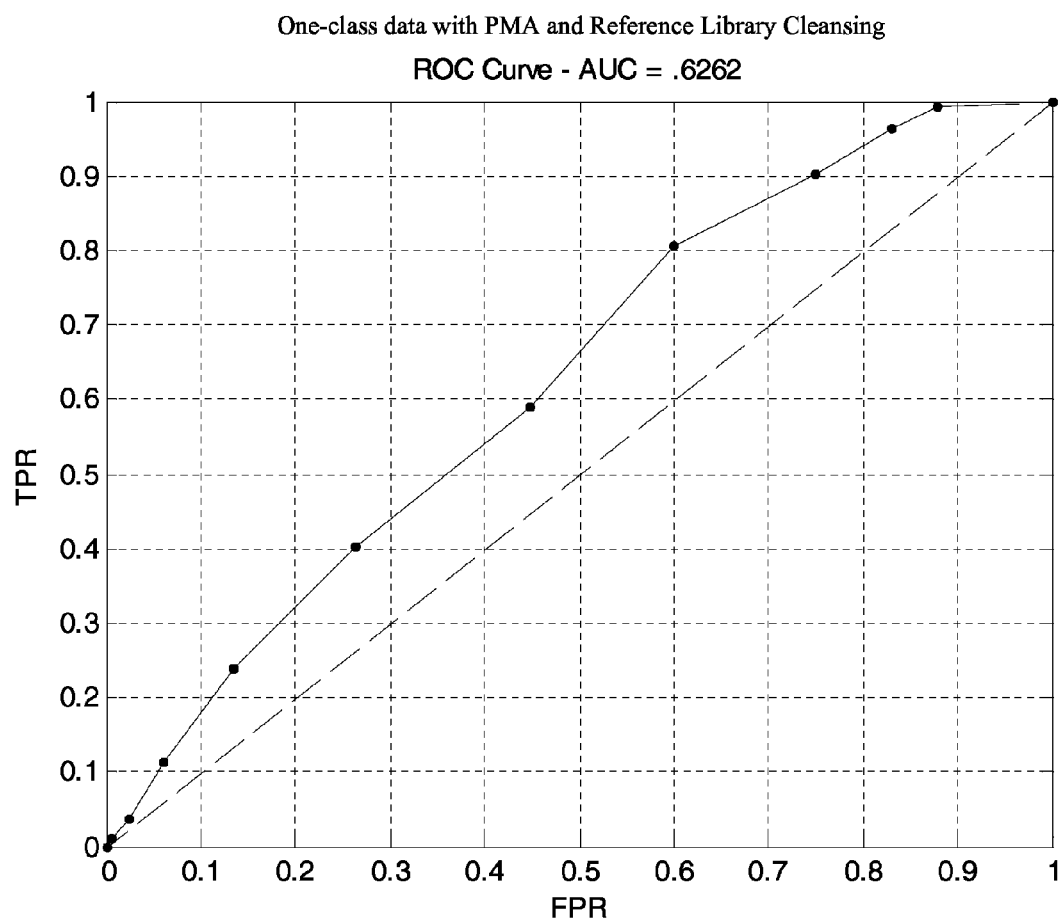
FIG. 16 is a chart illustrating a receiver operating characteristic curve for a partial class membership analysis model using cleansed data in accordance with one embodiment of the present invention.

Results from modeling the 590 test accounts with the 62 cleansed reference accounts are shown in the receiver operating characteristic (ROC) curve of FIG. 16. The ROC curve is a commonly used device to assess the efficacy of a binary classifier and to determine its best threshold. In an ROC curve, the true positive ratio (TPR) is plotted as a function of the false positive ratio (FPR) for a variety of class estimations determined by a series of thresholds applied to the results of a classification method. When modeled class identifiers are greater than a threshold, and when actual class identifiers have a value of one, then true positives are identified. When modeled class identifiers are greater than a threshold, but when actual class identifiers have a value of zero, then false positives are identified. The TPR is the number of true positives divided by the number of actual class identifiers that have a value of one. The FPR is number of false positives divided by the number of actual class identifiers that have a value of zero. The area under the curve (AUC) must be different from 0.5 in order for the classification method to be more useful than making random choices and the more the difference is from 0.5, the better the classification method is. For Example 2, the AUC=0.6262, thus, the cleansed reference library is useful for creating an initial call list with a yield of participating utility customers that is significantly better than making random choices.

Figure 17:
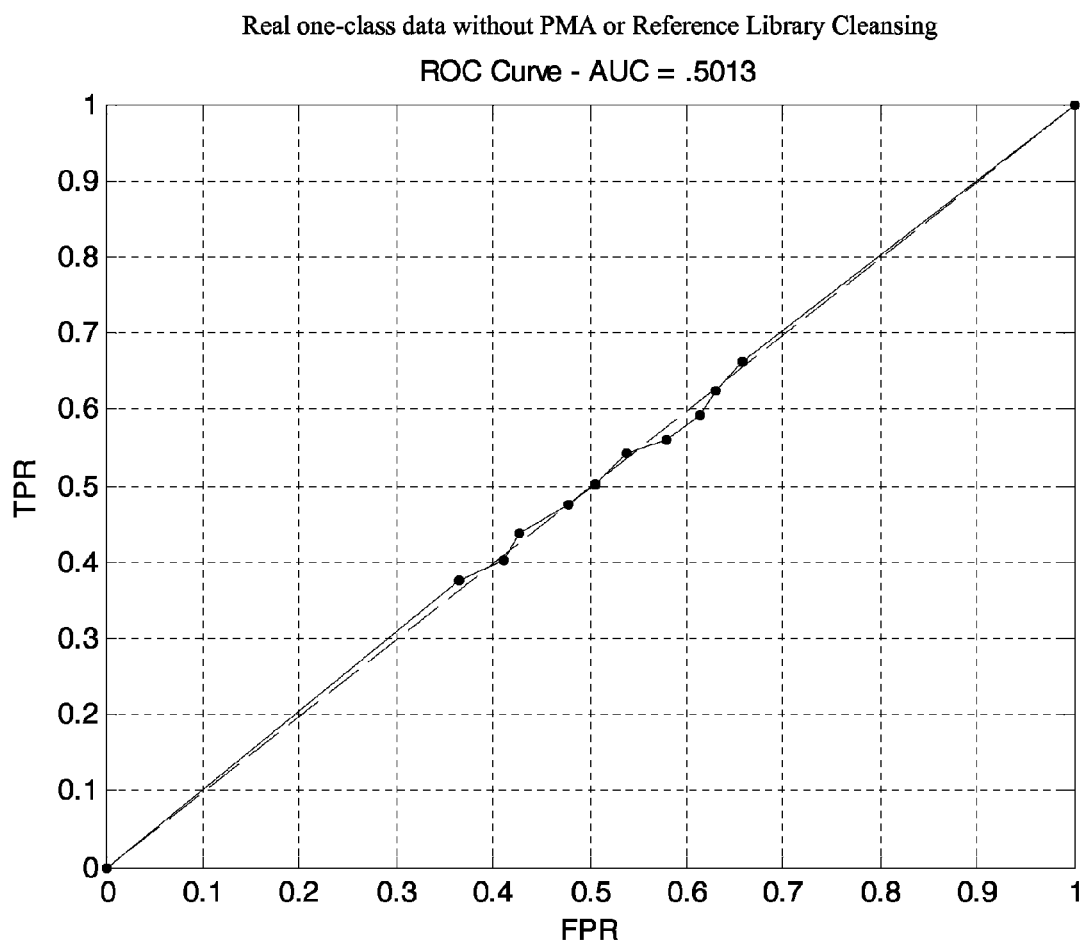
FIG. 17 is a chart illustrating a receiver operating characteristic curve for a non-partial class membership analysis model using the same data as FIG. 16 in accordance with one embodiment of the present invention.

In order to show the value of the cleansed reference accounts and the constrained modeling weights of PMA as applied above, all 590 reference records were used to model the 590 test accounts without requiring the modeling weights to all individually be greater than or equal to zero and less than or equal to one, nor sum to one. The model metric was again the Euclidian distance squared between the independent variables of the each modeled record and those of the reference records. And again 20 nearest-neighbor records were used for dynamically chosen reference data vectors. The results of this modeling are shown in the ROC curve of FIG. 17. For this application the AUC=0.5013, a result that indicates the cleansed reference library as applied above with constrained modeling weights, with an AUC=0.6262, is more useful for class identification than is the original reference library as applied here without constrained modeling weights. That is, the PMA results for reference library shown in FIG. 16 are clearly superior to the non-PMA results shown in FIG. 17, and are typical for situations that contain some spurious entries or have classes that are not well-defined by the independent variables.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to determine a partial class membership of a data record in a class, the apparatus comprising:
 a record set acquisition module that receives a record set comprising a plurality of reference records, each reference record comprising a set of independent variables, each independent variable having an independent variable value, wherein each reference record of the record set comprises a same set of independent variables, wherein each reference record belongs to a known class within a group of classes;

an unknown-class record receiving module that receives an unknown-class record, the unknown-class record comprising a set of independent variable values for the same set of independent variables as the independent variables of the reference records comprising the record set;

a class identification module that creates a class vector for each reference record by setting a class identifier for the known class of the reference record to a first value and setting a class identifier for each class in the group of classes other than the known class of the reference record to a second value;

a weighting module that calculates a set of unknown-class record weights for the unknown-class record according to a formula $W=(R^TR)^{-1}R^TX$ wherein W comprises a vector of the unknown-class record weights, R comprises a matrix of the independent variable values for each reference record comprising the record set, and X comprises a vector containing the independent variable values of the unknown-class record, wherein R and X are transformed by scaling and shifting such that the formula $W=(R^TR)^{-1}R^TX$ is accurate, the weighting module calculating a weight for each reference record in the record set, the set of unknown-class record weights calculated such that, when multiplied by the independent variable values of the reference records, a sum of the resultant values for each independent variable approximates each independent variable value in the set of independent variable values for the unknown-class record, each weight in the set of unknown-class record weights comprising a value greater than or equal to zero and less than or equal to one, wherein the sum of the set of unknown-class record weights approximates one;

a classification module that simultaneously determines a partial class membership for the unknown-class record for each class in the group of classes by applying the class vectors created by the class identification module to the set of unknown-class record weights created by the weighting module, wherein each partial class membership identifies a probability that the unknown-class record belongs to a corresponding class in the group of classes, the classification module determining a partial class membership for each class in the group of classes, the partial class memberships comprising a value between zero and one; and wherein the record set acquisition module, unknown-class record receiving module, class identification module, weighting module, and classification module comprise one or more of logic hardware and executable code, the executable code stored on one or more non-transitory machine-readable storage media.

2. The apparatus of claim 1, further comprising;

a record set weighting module that calculates a set of reference record weights for a tested reference record, the record set weighting module calculating a weight for each reference record in a remainder of reference records in the record set, the remainder of reference records comprising the reference records in the record set excluding the tested reference record, the set of reference record weights calculated such that, when multiplied by the independent variable values of the remainder of reference records in the record set, the set of reference record weights approximates a set of independent variable values for the tested reference record, each weight in the set of reference record weights comprising a value greater than or equal to zero and less than or equal to one, wherein the sum of the set of reference record weights approximates one;

a record set classification module that determines a reference record partial class membership for the tested reference record for each class in the group of classes by applying the class vectors for each of the remainder of reference records in the record set to the set of reference record weights created by the record set weighting module to create reference record partial class memberships for each class in the group of classes, wherein each reference record partial class membership identifies a probability that the tested reference record belongs to a corresponding class in the group of classes; and a cross-validation module that compares the known class of the tested reference record with the reference record partial class membership to determine whether the tested reference record belongs to the known class of the reference record.

3. The apparatus of claim 2, wherein the cross-validation module determines that the tested reference record belongs to the known class of the tested reference record by determining that the reference record partial class membership corresponding to the known class of the tested reference record is highest with respect to the other reference record partial class memberships calculated by the record set classification module.

4. The apparatus of claim 2, wherein the cross-validation module determines that the tested reference record belongs to the known class of the tested reference record by determining that the reference record partial class membership corresponding to the known class of the tested reference record is higher than a known partial class membership threshold.

5. The apparatus of claim 2, further comprising a cleansing module that removes a reference record from the record set if the cross-validation module determines that the tested reference record is not in the known class of the tested reference record.

6. The apparatus of claim 2, further comprising a cross-validation record set creation module that creates a unique cross-validation record set for the tested reference record by selecting a number of reference records in the record set that are nearest neighbors to the tested reference record, the number of reference records selected for the unique cross-validation record set comprising any number of reference records, wherein the record set weighting module calculates the set of reference weights using the unique cross-validation record set.

7. The apparatus of claim 6, wherein the number of reference records selected by the cross-validation record set creation module for the unique cross-validation record set is less than or equal to the number of independent variables in each reference record.

8. The apparatus of claim 6, wherein the cross-validation record set creation module selects the number of reference records in the record set that are nearest neighbors to the tested record by comparing a sum of square differences calculated for each reference record in the record set to identify a number of reference records in the record set that comprise the nearest neighbors to the tested reference record and by selecting for inclusion in the unique cross-validation record set the reference records having the least sum of square differences, wherein the sum of square differences is calculated as a difference between the independent variable values of the tested reference record and the independent variable values for the reference records comprising the record set.

9. The apparatus of claim 1, further comprising an unknown-class record set creation module that creates an unknown-class record set for the unknown-class record by selecting a number of reference records in the record set that are nearest neighbors to the unknown-class record, the number of reference records selected for the unknown-class record set comprising any number of reference records, wherein the weighting module calculates the set of unknown-class record weights for the unknown-class record using the reference records in the unknown-class record set.

10. The apparatus of claim 9, wherein the number of reference records selected by the unknown-class record set creation module for the unknown-class record set is less than or equal to the number of independent variables in the unknown-class record.

11. The apparatus of claim 9, wherein the unknown-class record set creation module selects the number of reference records in the record set that are nearest neighbors by comparing a sum of square differences calculated for each reference record in the record set to identify a number of reference records in the record set that comprise the nearest neighbors to the unknown-class reference record for inclusion in the unknown-class record set by selecting the reference records having the least sum of square differences, wherein the sum of square differences is calculated as a difference between the independent variable values of the unknown-class reference record and the independent variable values for the reference records comprising the record set.

12. The apparatus of claim 1, wherein the first value comprises a one and the second value comprises a zero such that the class identification module sets the class identifier for the known class of the reference record to one and sets the class identifier for each class in the group of classes other than the known class of the reference record to zero.

13. The apparatus of claim 1, wherein the weighting module calculates the set of unknown-class record weights by applying one of a least squares vector element model, a support vector model, a neural network model and a kernel regression model.

14. The apparatus of claim 1, wherein the classification module determines the partial class membership for the unknown-class record for each class in the group of class according to the formula P=CW wherein P comprises a vector of partial class memberships for each class in the group of classes, C comprises a matrix of class identifiers identified by the class identification module for each reference record in the record set, and W comprises a vector of the unknown-class record weights.

15. The apparatus of claim 1, wherein the classification module determines that the unknown-class record belongs to a class of the group of classes by determining that the partial class membership for the class of the group of classes is highest with respect to the other partial class memberships for the other classes within the group of classes.

16. The apparatus of claim 1, wherein the classification module determines that the unknown-class record belongs to a class of the group of classes by determining that the partial class membership corresponding to a class is higher than a class membership threshold.

17. An apparatus to determine a partial class membership of a data record in a class, the apparatus comprising:
a class identification module that creates a class matrix C for a plurality of reference records in a record set, each reference record comprising a set of independent variables having independent variable values, the class matrix C comprising a class identification vector for each reference record, the class identification vector identifying a known class for the reference record from a group of classes, the class identification vector comprising a class identifier for each class in the group of classes, wherein the class identifier is set to one for the known class, wherein the class identifier is set to zero for each class other than the known class;
a weighting module that calculates a vector W comprising unknown-class record weights for an unknown-class record, the vector W of unknown-class record weights calculated as $W=(R^TR)^{-1}R^TX$, wherein R comprises a matrix of independent variable values for a record set of reference records and X comprises a vector of independent variable values for the unknown-class record, the vector W of unknown-class record weights calculated such that Y=RW where Y is an approximation of the independent variable values in the vector X, wherein R, X and Y are transformed by scaling and shifting such that the formulas $W=(R^TR)^{-1}R^TX$ and Y=RW are accurate, wherein each unknown-class record weight in vector W comprises a value greater than or equal to zero and less than or equal to one, and wherein the sum of the weights in vector W approximates one;
a classification module that calculates a partial class membership vector P for the unknown-class record according to the formula P=CW, the partial class membership vector P comprising a probability value for each class in the group of classes, the probability value identifying a probability that the unknown-class record belongs to a corresponding class in the group of classes; and
wherein the class identification module, weighting module, and class identification module comprise one or more of logic hardware and executable code, the executable code stored on one or more non-transitory machine-readable storage media.

18. The apparatus of claim 17, further comprising;
a record set weighting module that calculates a vector W' comprising tested reference record weights for a tested reference record, the vector W' of tested reference record weights calculated as $W'=(R'^TR')^{-1}R'^TX'$, wherein R' comprises a matrix of independent variable values for a tested reference record set and X' comprises a vector of independent variable values for the tested reference record, the tested reference record set comprising a group of reference records from the record set, the vector W' of tested reference record weights calculated such that Y'=R'W' where Y' is vector identifying an approximation of the independent variable values in the vector X', wherein R', X' and Y' are transformed by scaling and shifting such that the formulas $W'=(R'^TR')^{-1}R'^TX'$ and Y'=R'W' are accurate, wherein each tested reference record weight in vector W' comprises a value greater than or equal to zero and less than or equal to one, and wherein the sum of the weights in vector W' approximates one;
a record set classification module that calculates a tested reference record set partial class membership vector P' for the tested reference record according to the formula P'=C'W' , the tested reference record set partial class membership vector P' comprising a probability value for each class in the group of classes, the probability value identifying a probability that the tested reference record belongs to a corresponding class in the group of classes, wherein C' comprises a tested reference record set class matrix comprising a tested reference record set class identification vector for each reference record in the tested reference record set, the tested reference record set class identification vector identifying a known class for the reference records comprising the tested reference record set, the tested reference record set class identification vector comprising a class identifier for each class in the group of classes, wherein the class identifier is set to one for the known class, wherein the class identifier is set to zero for each class other than the known class; and a cross-validation module that compares the known class of the tested reference record with the reference record partial class membership P' to determine whether the tested reference record belongs to the known class of the tested reference record.

19. A computer program product comprising a computer readable medium having computer usable program code stored on one or more non-transitory machine-readable storage media, the computer usable program code executable to perform operations for determining a partial class membership of a data record in a class, the operations of the computer program product comprising:

receiving a record set comprising a plurality of reference records, each reference record comprising a set of independent variables, each independent variable having an independent variable value, wherein each reference record of the record set comprises a same set of independent variables, wherein each reference record belongs to a known class within a group of classes;

receiving an unknown-class record, the unknown-class record comprising a same set of independent variables as the independent variables of the reference records comprising the record set;

creating a class vector for each reference record by setting a class identifier for the known class of the reference record to a first value and setting a class identifier for each class in the group of classes other than the known class of the reference record to a second value;

calculating a set of unknown-class record weights for the unknown-class record according to a formula $W=(R^TR)^{-1}R^TX$ wherein W comprises a vector of the unknown-class record weights, R comprises a matrix of the independent variable values for each reference record comprising the record set, and X comprises a vector containing the independent variable values of the unknown-class record, wherein R and X are transformed by scaling and shifting such that the formula $W=(R^TR)^{-1}R^TX$ is accurate, the set of unknown-class weights comprising a weight for each reference record in the record set, the set of unknown-class record weights calculated such that, when multiplied by the independent variable values of the reference records, a sum of the resultant values for each independent variable approximates each independent variable value in the set of independent variable values for the unknown-class record, each weight in the set of unknown-class record weights comprising a value greater than or equal to zero and less than or equal to one, wherein the sum of the set of unknown-class record weights approximates one; and simultaneously determining a partial class membership for the unknown-class record for each class in the group of classes by applying the class vectors for each reference record to the set of unknown-class record weights, wherein each partial class membership identifies a probability that the unknown-class record belongs to a corresponding class in the group of classes, wherein a partial class membership for each class in the group of classes is determined and wherein the partial class memberships comprise a value between zero and one.

* * * * *